US012679558B2

(12) United States Patent
Clough et al.

(10) Patent No.: US 12,679,558 B2
(45) Date of Patent: Jul. 14, 2026

(54) CABLE HARNESS SLEEVES

(71) Applicant: AIRBUS OPERATIONS LIMITED, Bristol (GB)

(72) Inventors: James Clough, Bristol (GB); Javier Ruiz De Pablo, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 19/272,515

(22) Filed: Jul. 17, 2025

(65) Prior Publication Data

US 2026/0021905 A1 Jan. 22, 2026

(30) Foreign Application Priority Data

Jul. 18, 2024 (GB) ...................................... 2410502

(51) Int. Cl.
*B64C 3/56* (2006.01)
*B64D 47/00* (2006.01)

(52) U.S. Cl.
CPC ................ *B64D 47/00* (2013.01); *B64C 3/56* (2013.01); *B64D 2221/00* (2013.01)

(58) Field of Classification Search
CPC ........ B64D 47/00; B64D 2221/00; B64C 3/56
See application file for complete search history.

(56) References Cited

U.S. PATENT DOCUMENTS 9,455,557 B2 * 9/2016 Blanchard ............ H02G 3/0437
2023/0242242 A1 * 8/2023 Edwards ................... B64F 5/60 244/46
2023/0242245 A1 * 8/2023 Edwards ............... B64C 23/072 244/199.4

FOREIGN PATENT DOCUMENTS

| | | | |
|---|---|---|---|
| CN | 209297781 | U | 8/2019 |
| EP | 3 647 181 | A1 | 5/2020 |
| EP | 3 841 645 | B1 | 2/2024 |
| WO | 2006/027624 | A1 | 3/2006 |
| WO | 2009/000005 | A1 | 12/2008 |
| WO | 2023/165963 | A1 | 9/2023 |

OTHER PUBLICATIONS

Partial European Search Report for Application No. EP 25189522.3, 17 pages, dated Sep. 5, 2025.
Search Report for Application No. GB2410502.5, dated Jan. 20, 2025, 4 pages.

* cited by examiner

*Primary Examiner* — Tye William Abell
(74) *Attorney, Agent, or Firm* — Nixon & Vanderhye, PC

(57) ABSTRACT

An aircraft wing having a fixed wing and a moveably mounted wing tip device is disclosed. A first cable harness and a second cable harness which are received in a protective sleeve extend between the fixed wing and the wing tip device. The protective sleeve is in a secured configuration in which at least two opposing parts of the protective sleeve are secured together between the first cable harness and the second cable harness to provide the sleeve with a first channel in which the first cable harness is received a second channel in which the second cable harness is received, and a webbing region extending between the first channel and the second channel such that the first and second cable harnesses are held apart by the webbing region.

19 Claims, 10 Drawing Sheets

Fig. 3
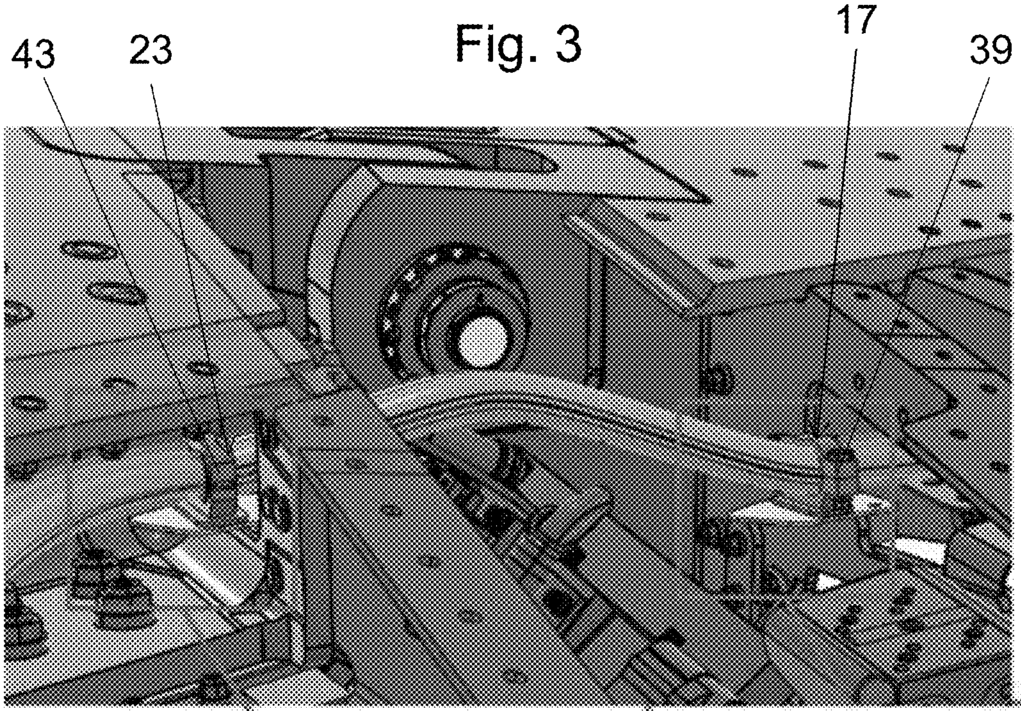
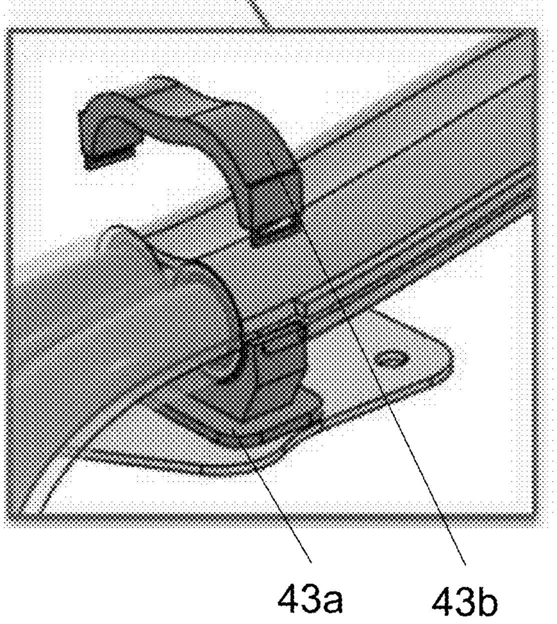
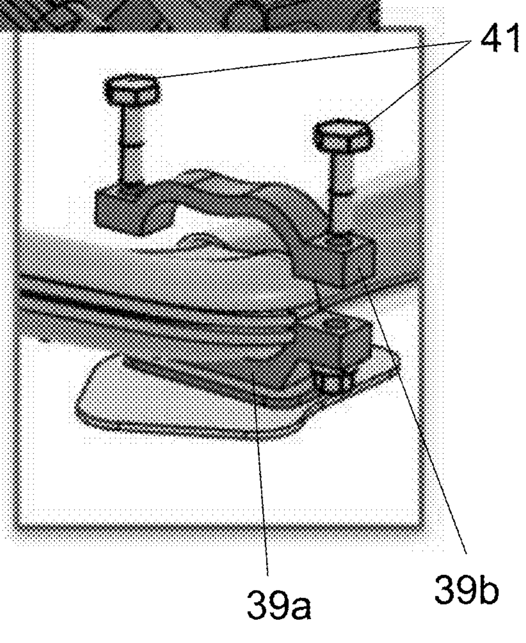
Fig. 4A
Fig. 4B

CABLE HARNESS SLEEVES

CROSS RELATED APPLICATION

This application claims priority to United Kingdom Patent Application GB 2410502.5, filed Jul. 18, 2024, the entire contents of which is hereby incorporated by reference.

BACKGROUND OF THE INVENTION

The present invention relates to an aircraft wing comprising a fixed wing, a moveable wing tip device, and cable harness extending from the fixed wing into the wing tip device. The present invention also concerns an aircraft and a protective sleeve for a cable harness.

There is a trend towards increasingly higher aspect ratio wings for large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and taxiway usage).

Therefore, movable wing tip devices have been introduced into passenger aircraft, where a wing tip device is movable between a flight configuration for use during flight, and a ground configuration for use during ground-based operations. In the flight configuration, the wing tip device forms an extension of the wing and contributes to the lift generated by the wing. In the ground configuration, the wing tip device is moved away from the flight configuration such that the effective span of the aircraft wing is reduced, thereby allowing use of existing gates and taxiways. Such an arrangement is sometimes referred to as a 'folding wing tip'.

It is desirable to transfer power and/or data into a folding wing tip. In most parts of an aircraft, power and data can be readily provided via suitable electrical wiring. This is typically provided in a cable harness (also referred to as a wiring harness, or wiring loom). However, in the context of a folding wing tip there are several challenges. Firstly, the cable harness must extend across a joint and must therefore be arranged to cope with repeated exposure to potentially harsh environmental conditions, with movement, and/or with changes in tensional loads. Secondly, there tends to be relatively little available volume within the aircraft structure towards the tip of the wing. The ability to incorporate a degree of slack in the cable harness may therefore be restricted.

It has also been recognised that it may be beneficial to provide a high voltage feed to the folding wing tip. However, the use of a high voltage feed presents several challenges. For example, it is necessary to provide sufficient segregation of the high voltage wiring from adjacent structure, to ensure the adjacent structure is not damaged in the event of arcing. It is also necessary to reliably segregate the high voltage wiring from other wiring. This can be challenging in the vicinity of the folding wing tip, because there tends to be relatively little space (a problem exacerbated by the need to provide two independent feeds within that space, to ensure redundancy). The movement of the folding wing tip can also cause movement of the cable harness, so it may be necessary to provide additional tolerance to cater for this, both to ensure there is no risk of arcing and to ensure there is no potential for abrasion, for example between other wiring, where present.

Aspects of the present invention seek to mitigate one or more of the above-mentioned challenges. Alternatively or additionally, aspects of the present invention seek to provide an improved aircraft wing with a moveable wing tip device, and improved aircraft, and an improved cable harness sleeve.

WO2023165963 (Latelec) discloses a fastener for fastening at least one cable to a structure of an aircraft wing, a portion of which is movable between an initial position and a final position. A clamping collar is inserted into a base plate, and the base plate holds the clamping collar in a nominal position when the movable portion of the structure is in the initial position. The clamping collar swivels about a swivel pin when one of the cables is biased in one direction by the movement of the movable portion of the structure. The collar returns to the nominal position when the cables are released.

US20230242242 (Airbus Operations Limited) discloses a folding wing tip arrangement with an inductive coupler is arranged to inductively transmit data and/or power between the main wing element and the movable wing tip device. US20230242245 (Airbus Operations Limited) discloses a folding wing tip having an accumulator configured to store energy. The accumulator enables energy to trickle between the main wing element and the movable wing tip device whilst still providing a suitable power source to the device. In an embodiment of US20230242245 the energy is transferred using an inductive coupler. The use of an inductive coupler provides an alternative solution to the challenges of passing power and data across the folding wing tip joint, namely it removes the need for wiring to pass across that joint.

U.S. Pat. No. 9,455,557 (Airbus Operations Limited) discloses an electrical cable raceway and a protector for protecting wires/cables as they span a gap between sections of the raceway. U.S. Pat. No. 9,455,557 discloses a protector arrangement for cable raceways per se, rather than addressing the specific challenges with folding wing tips.

SUMMARY OF THE INVENTION

According to a first aspect of the invention, there is provided an aircraft wing. The wing comprises a fixed wing and a wing tip device moveably mounted at a joint at the end of the fixed wing. The wing tip device is moveable about the joint between: (i) a flight configuration for use during flight, and (ii) a ground configuration for use during ground-based operations, in which ground configuration the wing tip device is moved relative to the fixed wing such that the span of the wing is reduced. The wing comprises a first cable harness and a second cable harness, the first and second cable harnesses extending between the fixed wing and the wing tip device, and each of the first and second cable harnesses comprising a plurality of conductors, the conductors being arranged to transmit electrical power and/or data to the wing tip device. The wing further comprises a protective sleeve and the first and second cable harnesses are received in the protective sleeve. The protective sleeve is configured to a secured configuration in which at least two opposing parts of the protective sleeve are secured together between the first cable harness and the second cable harness to provide the sleeve with a first channel in which the first cable harness is received, a second channel in which the second cable harness is received, and a webbing region formed by the at least two opposing parts, the webbing region extending between the first channel and the second channel such that the first and second cable harnesses are held apart by the webbing region.

The aircraft wing according to the first aspect of the invention comprises a protective sleeve that carries two cable harnesses. The protective sleeve has been found to be especially beneficial because it may ensure that the two harnesses do not interfere with each other during movement of the wing tip between the flight and ground configurations (thereby causing abrasion or chaffing for example). Such an arrangement may also ensure that the cable harnesses can both be held in a relatively compact arrangement, which has been found to be especially important towards the tip of the aircraft wing. Furthermore, the use of the protective sleeve of the present invention may allow the high voltage cable harness to be placed closer to other wiring than in prior art arrangements. In particular, the webbing region of the sleeve ensures that the two cable harnesses cannot touch. By providing the high voltage cable harness in the protective sleeve, the risk of arcing to adjacent structure is also reduced, thereby allowing use of the cable harness in the confined volume of the wing tip.

The protective sleeve may comprise a resiliently deformable material. The protective sleeve may be resiliently deformable to the secured configuration.

The sleeve is an electrical insulator. The protective sleeve may comprise a fluorosilicone polymer. A sleeve comprising fluorosilicone polymer has been found to be especially beneficial. In particular, fluorosilicone polymer has been found to possess properties that make it surprisingly beneficial in the context of a folding wing tip. For example, this type of material may have good resistance to the environmental conditions that the sleeve is exposed to, as well as providing the necessary electrical insulation properties.

Fluorosilicone polymer is an elastomer made up from silicone polymer chains with fluorinated side groups. The fluorosilicone polymer may comprise a silicone polymer having methyl and/or vinyl side groups attached to the silicon atoms in the chain, wherein at least some of the side groups are fluorinated. Optionally, the polymer comprises a fluorinated alkyl side groups, such as trifluoropropyl. Such fluorosilicone polymers may be of general formula (A):

Structure A

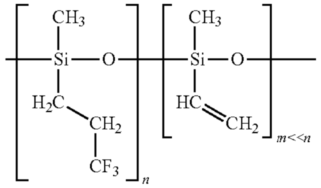

Such fluorosilicone polymers may be of general formula (B):

Structure B $$[\text{---}(Si(CH_3)_2\text{---}O)_m\text{---}(Si(CH_3)(C_2H_4CF_3)\text{---}O)_n\text{---}]$$

The fluorosilicone polymer may be known as a FVMQ material.

Optionally, the sleeve comprises at least 95% by weight of the fluorosilicone polymer, optionally at least 96%, optionally at least 97%, optionally at least 98% and optionally at least 99% by weight of the fluorosilicone polymer. Optionally, the sleeve is formed from the fluorosilicone polymer.

The sleeve, and optionally the fluorosilicone polymer, may optionally have a hardness as measured on the Shore A hardness scale of from 60 to 80, optionally of from 62 to 78, optionally of from 65 to 75 and optionally of about 70. Such a hardness may be particularly effective in dealing with the multiple bending and unbending procedures to which a folding wingtip is subjected. Shore A hardness may be determined using ISO7619-1:2010.

An O-ring of the protective sleeve, and optionally the fluorosilicone polymer, optionally has a tensile strength of from 2 to 6 MPa, optionally of from 3 to 5 MPa and optionally of about 4 MPa as determined in accordance with ISO37 (test specimen S2), with an elongation at break of from 100 to 150%, optionally of from 110 to 140% and optionally of from 120 to 130%.

A standard test specimen of the protective sleeve, and optionally the fluorosilicone polymer, optionally has a tensile strength of from 4 to 12 MPa, optionally of from 6 to 10 MPa and optionally of from 7 to 9 MPa as determined on a standard test specimen in accordance with ISO37, with an elongation at break of from 200 to 500%, optionally of from 250 to 450%, optionally of from 300 to 400% and optionally of about 350%.

The protective sleeve, and optionally the fluorosilicone polymer, optionally has a tear strength of from 5 to 40 N/mm, optionally of from 10 to 40 N/mm, optionally of from 10 to 30 N/mm and optionally of about 20 N/mm as determined in accordance with ISO34-1, test method B, procedure b.

The sleeve, and optionally the FVMQ fluorosilicone polymer, has a temperature associated with a resistance to low temperature as determined by TR10 in ISO2921 of no more than −20° C., optionally of no more than −30° C., optionally of no more than −40° C. and optionally no more than −50° C.

This composition of fluorosilicone polymer has been found to possess the favourable properties above and has also been found to cope especially well with repeated flexing, as occurs during movement of the wing tip device between ground and flight configurations.

The sleeve may be formed from a single piece of material. For example the sleeve may be moulded. The sleeve may be extruded.

The webbing region may comprise a barrier, the barrier being positioned between the first cable harness and the second cable harness. A barrier may be beneficial to prevent arcing between the first and second cable harnesses. The barrier may at least partially form a wall of the first channel. The barrier may at least partially form a wall of the second channel.

In the secured configuration of the protective sleeve, the at least two opposing parts may be secured together by a plurality of fasteners. The fasteners may pass through the at least two opposing parts. The fasteners may be spaced apart along a length direction of the protective sleeve. The fasteners may be two part pins. The fasteners may be integrally formed with the sleeve. In embodiments, other suitable types of fastener may be used. The fasteners may pass through the opposing parts in the webbing region.

The sleeve may be arranged such that, in the secured configuration of the sleeve, the first cable harness is spaced apart from the second cable harness by at least 10 millimetres. The sleeve may be arranged such that, in the secured configuration of the sleeve, the first cable harness is spaced apart from the second cable harness by at least 20 millimetres. However, in embodiments of the invention the first cable harness may be positioned closer to the second cable harness, particularly where the webbing region provides a barrier between the first cable harness and the second cable harness.

The sleeve may comprise an outer wall. The portion of the outer wall surrounding the respective cable harnesses may have a thickness of at least 2 millimetres.

In some embodiments, a first projecting member may project from an inner surface of the outer wall on a first opposing part. In the secured configuration of the protective sleeve, the first projecting member may abut with a second opposing part of the protective sleeve such that the first projecting member at least partially forms the barrier between the first cable harness and the second cable harness. The outer wall may be continuous. The sleeve may have a closed cross-section. Where the sleeve has a closed cross-section there may be only two opposing parts. The first projecting member may comprise a rib. The first projecting member may extend along a longitudinal length of the sleeve. The first projecting member may be positioned at or towards a first transverse side of the first opposing part. The first projecting member may be positioned at or towards an opposite second transverse side of the first opposing part.

The sleeve may comprise a second projecting member that projects from the inner surface of the outer wall on the first opposing part (this may correspond to the "third projecting member" as described below). The second projecting member being transversely spaced apart from the first projecting member. In the secured configuration of the protective sleeve, the first projecting member may abut with a second opposing part of the protective sleeve such that the second projecting member at least partially forms the barrier between the first cable harness and the second cable harness.

The sleeve may comprise a second projecting member that projects from an inner surface of the protective sleeve on the second opposing part. In the secured configuration of the protective sleeve, the second projecting member may abut with the first opposing part of the protective sleeve such that the second projecting member at least partially forms the barrier between the first cable harness and the second cable harness. The second projecting member may comprise a rib. The second projecting member may extend along a longitudinal length of the sleeve. The second projecting member may be positioned at or towards a first transverse side of the second opposing part. The second projecting member may be positioned at or towards an opposite second transverse side of the second opposing part. The second projecting member may be positioned opposite the first projecting member. The second projecting member may be transversely spaced from the first projecting member.

The first projecting member may be positioned opposite the second projecting member such that, in the secured configuration of the sleeve, the first projecting member and second projecting member abut with one another. The first and second projecting members may form a wall between the first cable harness and the second cable harness.

One or both of the first or second projecting members may abut with an opposing part of the protective sleeve proximal the other one of the first or second projecting members. The first and second projecting members may partially define a wall of the first or second channel. There may be a third and optionally a fourth projecting member. The third and fourth projecting members may have any of the features described with respect to the respective first and second projecting members.

The third projecting member may be positioned at or near an opposite second transverse side of the first opposing part. The fourth projecting member may be positioned at or near an opposite second transverse side of the second opposing part. The third projecting member may be positioned opposite the fourth projecting member. The third and fourth projecting members may partially define a wall of the first or second channel.

In some embodiments, the protective sleeve comprises a sheet. In the secured configuration of the protective sleeve, the sheet is wrapped around at least one of the first cable harness or second cable harness and a first opposing part of the sheet is secured to a second opposing part of the sheet to form at least one of the first channel or second channel. The sheet may have an undeformed configuration in which the sheet is substantially planar, in which case configuring the protective sleeve to the secured configuration would require deforming the sheet to wrap the sheet around at least one of the first or second cable harnesses. Alternatively, the sheet could be pre-formed to the shape that matches or closely matches the shape of the protective sleeve in the secured configuration.

The sheet may comprise a first portion, a second portion, and an intermediate portion between the first portion and the second portion. In the secured configuration of the protective sleeve, the first portion of the sheet may be wrapped around the first cable harness. An end of the first portion may form an opposing part that is secured to an opposing part formed by the intermediate portion to provide the first channel. The second portion of the sheet may be wrapped around the second cable harness. An end of the second portion may form an opposing part that is secured to an opposing part that is formed by the intermediate portion to form the second channel. The intermediate portion and at least one of the second portion or first portion may form the webbing region. The end of the first portion may form an opposing part. The end of the second portion may form an opposing part. The intermediate portion may form an opposing part.

In some embodiments, the first portion of the sheet wraps around the first harness in a first direction and the second portion of the sheet wraps around the second harness in the first direction such that the intermediate portion forms the barrier between the first cable harness and the second cable harness. Such an arrangement is particularly advantageous because the intermediate portion provides a physical barrier between the first cable harness and the second cable harness. For example, the first portion of the sheet may extend from the intermediate portion, over the first cable harness, and wrap under the first cable harness back towards the intermediate portion and the second portion of the sheet may extend from the intermediate portion, under the second cable harness, and wrap over the second cable harness back towards the intermediate portion. Alternatively, the first portion of the sheet may extend from the intermediate portion, under the first cable harness, and wrap over the first cable harness back towards the intermediate portion; whereas the second portion of the sheet may extend from the intermediate portion, over the second cable harness, and wrap under the second cable harness back towards the intermediate portion. The first portion and the second portion may both wrap around their respective cable harnesses in a clockwise direction or, alternatively, both the first portion and the second portion may wrap around their respective cable harnesses in an anticlockwise direction.

The sheet may have a thickness. The thickness of the first portion of the sheet may be approximately equal to the thickness of the second portion of the sheet. The thickness of the intermediate portion of the sheet may be greater than the thickness of the first portion or second portion. For example, the thickness of the intermediate portion of the sheet may be at least 20% greater than the thickness of the first portion or second portion. In some embodiments, the thickness of the intermediate portion may be at least 50% greater than the thickness of the first portion or second portion. However, in some embodiments the sheet may have a substantially constant thickness, in which case the thickness of the first portion, the second portion, and the intermediate portion may be approximately equal to one another. The thickness of the sheet, or of each portion of the sheet, may be equal to at least 1 millimetre. In some embodiments, the thickness of the sheet, or of each portion of the sheet may be equal to at least 2 millimetres. It is envisaged that the thickness of any portion of the sheet will generally be no more than 10 millimetres, but it may have a greater thickness in certain embodiments.

In the secured configuration of the protective sleeve, the end of the first portion of the sheet may be secured to the end of the second portion of the sheet. The intermediate portion may be sandwiched between the end of the first portion and the end of the second portion.

The sleeve may have a first end, proximal the fixed wing, and a second end, proximal the wing tip device, such that the sleeve extends over a length of the cable harness spanning the joint. The aircraft wing may be arranged such that the length of the sleeve between the first end and the second end is exposed to the external environment when the wing tip device is in the ground configuration. Aspects of the invention have been found to be especially beneficial in this part of the aircraft wing because it tends to be exposed to harsh environmental conditions. Furthermore, a sleeve and/or harness in this part of the aircraft wing tends to be subjected to movement, and/or changes in tensional loads.

The sleeve may be removable from the cable harness between the first and second ends. Such an arrangement has been found to be especially beneficial because it may allow the sleeve to be installed, and/or removed, for example for replacement or repair, without needing to remove the harness. Furthermore, ensuring this particular length of the sleeve (i.e. the length spanning the joint) is removable has been found to be especially beneficial because it is this length that is most likely to be exposed to potential damage or wear. Furthermore, this length tends to be readily accessible when the wing tip device is in the ground configuration.

The first end of the sleeve may be fixedly held in place relative to the fixed wing. The second end of the sleeve may be fixedly held in place relative to the wing tip device. The length of the sleeve therebetween may be configured to flex during movement of the wing tip device between the flight and ground configurations, thereby accommodating movement of the harness during movement between those configurations.

The first and second ends of the sleeve may be fixedly held in place by clamps. The clamps may be releasable. Such an arrangement has been found to be especially beneficial in facilitating efficient removal of the sleeve.

The first cable harness may comprise a high voltage conductor, arranged to transmit a high voltage supply. The high voltage supply may be at least 240V DC. The high voltage supply may be up to 270V DC. The high voltage supply may be up to 300V DC. The high voltage supply may be 270V DC. Aspects of the invention may be especially beneficial when a cable harness is used for a high voltage supply because the presence of the high voltage creates specific safety requirements. For example, to minimise risk of arcing the high voltage supply must be kept a minimum distance away from other electrical wiring, and must also be kept a minimum distance away from adjacent aircraft structure.

In arrangements comprising a second cable harness, the second cable harness may comprise a low voltage conductor arranged to transmit a low voltage supply. The low voltage supply may be less than 40V DC. The low voltage supply may be 28V or less.

The sleeve may be arranged such that the first cable harness is spaced apart from the second cable harness by less than 75 mm, and more preferably by less than 50 mm. The sleeve may be arranged such that the first cable harness is spaced apart from the second cable harness by 25 mm or less.

The sleeve may comprise a wall substantially surrounding the, or each, cable harness. Where the sleeve comprises an FVMQ material, the wall may have a wall thickness of at least 0.79 mm. This has been found to be the minimum thickness required to ensure arc protection when the sleeve comprises an FVMQ material. The wall thickness may be at least 1 mm, and more preferably at least 2 mm. The wall may have a wall thickness of less than 5 mm.

The aircraft wing may comprise a sleeve guide. The sleeve guide may be located above the sleeve. The sleeve guide may be configured to constrain movement of the sleeve such that the sleeve bends about the sleeve guide during movement of the wing tip device from the flight configuration to the ground configuration. Such an arrangement may be beneficial because it tends to ensure a predictable locus of movement of the sleeve during movement of the wing tip from the flight to ground configurations. The risks of the cable harnesses coming too close to adjacent structure is therefore reduced.

When the wing tip device is in the flight configuration, the sleeve may be in contact with the sleeve guide and the sleeve is more preferably urged against the sleeve guide. The sleeve may be biased against the sleeve guide. Such an arrangement may be beneficial because it mitigates vibrational movement of the sleeve (which would otherwise risk undue wear to the sleeve).

The aircraft wing may comprise a second sleeve guide. The second sleeve guide may be located below the sleeve. The second sleeve guide may be configured to constrain movement of the sleeve such that the sleeve bends about the sleeve guide during movement of the wing tip device from the ground configuration to the flight configuration. Such an arrangement may be beneficial because it tends to ensure a predictable locus of movement of the sleeve during movement of the wing tip from the ground to the flight configuration.

In the flight configuration the sleeve may be in contact with the sleeve guide and is more preferably urged against the second sleeve guide. Such an arrangement may be beneficial because it mitigates vibrational movement of the sleeve.

The combination of the first and second sleeve guides has been found to be especially beneficial because it may allow a predictable locus of movement of the sleeve during movement of the wing tip in both directions between the ground to the flight configuration.

The sleeve guides may be offset in a vertical direction from a line joining each end of the sleeve. In this manner, the sleeve may be fed between the two sleeve guides in such a way that the sleeve is naturally urged against both sleeve guides, thereby constraining vibrational movement.

At least one, and preferably both, the sleeve guides are associated with the fixed wing. The, or each, sleeve guide may be mounted on the fixed wing and fixed relative thereto.

The sleeve may comprise a slit. The slit may extend along the length of the sleeve. The sleeve may be resiliently deformable to open the slit, such that the sleeve can be removed from the cable harness by opening the slit around the harness.

The slit may be located on the underside of the sleeve. Such an arrangement has been found to be beneficial because it may limit water ingress and/or it may allow drainage of any moisture accumulating in the sleeve.

The sleeve may comprise a pair of closure tabs either side of the slit. The closure tabs in the pair, may be held together to close the slit. In some embodiments of the invention, the closure tabs may be held together by a plurality of fasteners.

The sleeve may comprise a first slit extending along the length of the first channel and a second slit extending along the length of the second channel. The sleeve may be resiliently deformable to open the first and second slits, such that the sleeve can be removed from the first and second cable harnesses by opening the first and second slits around the respective first and second cable harnesses.

Each of the plurality of conductors in the cable harness is preferably a sheathed conductor. Each of the conductors may take a number of forms depending on its use. The conductor may be a wire, but is more preferably a cable. For example the conductor may be a single core cable, or a multi-core cable. The first and/or second cable harnesses may each comprise a multiplicity of conductors.

The aircraft wing may comprise a first assembly comprising a sleeve and cable harnesses as described with reference to any of the aspects above, and a second assembly comprising a sleeve and cable harnesses as described with reference to any of the aspects above. The second assembly may be arranged as a back-up assembly in the event of failure of the first assembly. One of the assemblies may be located towards the leading edge of the wing. The other of the assemblies may be located towards the trailing edge of the wing.

The fixed wing may have an upper surface and a lower surface. The wing tip device may have an upper surface and a lower surface. In the flight configuration, the upper and lower surfaces of the wing tip device may be continuations of the upper and lower surfaces of the fixed wing. In the flight configuration, the trailing edge of the wing tip device may be a continuation of the trailing edge of the fixed wing. The leading edge of the wing tip device may be a continuation of the leading edge of the fixed wing. It may be that there is a smooth transition from the fixed wing to the wing tip device. It will be appreciated that there may be a smooth transition even when the shape of the wing is such that there are changes in sweep or twist at the junction between the fixed wing and wing tip device. It may be that there are no discontinuities at the junction between the fixed wing and wing tip device.

It may be that rotation of the wing tip device from the flight configuration to the ground configuration comprises upward rotation of the wing tip device relative to the fixed wing. In this way, the wing may comply with an airport compatibility gate limit, while also maintaining a reasonable ground clearance.

In the flight configuration, the span of the wing may exceed an airport compatibility gate limit. In the ground configuration the span is reduced such that the span (with the wing tip device in the ground configuration) is less than, or substantially equal to, the airport compatibility gate limit. In the ground configuration, the wing tip device may be positioned such that the wing has its shortest span. In the ground configuration, the wing tip device may be oriented substantially vertical.

It may be that the wing tip device rotates in a first direction from the ground configuration to the flight configuration. It may be that the wing tip device rotates in a second direction, opposite to the first direction, from the flight configuration to the ground configuration.

The wing tip device may be a wing tip extension, for example a generally planar tip extension. In other embodiments, the wing tip device may comprise, or consist of, a non-planar device, such as a winglet. The wing tip device may comprise a further wing section having a further movable wing tip device at its distal end. The ordinarily skilled person will be aware of other devices suitable for movably placing at the wing tip. The wing tip device may include, for example, trailing edge moveable devices for control (ailerons) or leading edge devices for stall protection, such as slats or droop nose devices.

The span ratio of the fixed wing relative to the wing tip device may be such that the fixed wing comprises at least 60%, 70%, 80%, 90%, or more, of the overall span of the wing.

When the wing tip device is in the ground configuration, the aircraft may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration. In the ground configuration the wing tip device may be held in place. For example the wing tip device may be latched or locked in place to prevent movement back towards the flight configuration.

The aircraft may comprise an actuator for moving the wing tip device between the flight configuration and the ground configuration.

The wing tip device is moveably mounted at a joint at the end of the fixed wing. The joint may be a hinge joint. The joint may comprise a plurality of lugs. A hinge axis may pass through the plurality of lugs, the wing tip device being rotatable about said hinge axis, between the flight and ground configurations.

The wing may comprise a third cable harness extending between the fixed wing and the wing tip device. The third cable harness may comprise a plurality of conductors arranged to transmit electrical power and/or data to the wing tip device. Part of the intermediate portion of the sheet may at least partially define a third channel in which the third cable harness is received. Part of the intermediate portion adjacent the third channel and at least one of the second portion or first portion may form the webbing region. Part of the intermediate portion between the third channel and one of the first channel or second channel may form the webbing region. The sleeve may comprise a further sheet secured to the intermediate portion of the first sheet to provide the third channel between the first sheet and the further sheet.

The further sheet may be secured to intermediate portion of the first sheet on a first side of the third channel. The further sheet may be secured to intermediate portion of the first sheet on an opposite second side of the third channel. The sleeve may comprise a first webbing region on a first side of the third channel. The sleeve may comprise a second webbing region on an opposite second side of the third channel.

The first and second cable harnesses may be approximately equal in diameter. The third cable harness may have a diameter which is greater than the diameter of the first and second cable harnesses. The first, second, and, where present, third cable harness may all have a different diameter.

According to a second aspect of the invention, there is provided an aircraft comprising a wing according to the first aspect of the invention.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and optionally more than 75 passengers. The aircraft may be a commercial aircraft, for example a commercial passenger aircraft, for example a single aisle or twin aisle aircraft. The aircraft need not be configured for carrying passengers, but could for example be an aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

According to a third aspect of the invention, there is provided a cable harness sleeve configured for use on a folding wing. The sleeve has an outer wall which surrounds and defines and internal channel, a first opposing part on a first side of the outer wall, a second opposing part on an opposite second side of the outer wall, and a first projecting member that projects from an inner surface of the outer wall on the first opposing part. The protective sleeve is configurable to a secured configuration in which the first opposing part is moved towards the second opposing part to move the first projecting member into abutment with the second opposing part to provide the sleeve with a first channel configured to receive a first cable harness, a second channel configured to receive a second cable harness, and a webbing region formed by the first opposing part and the second opposing part. The webbing region extends between the first channel and the second channel to fix the position of the first channel relative to the second channel.

The cable harness sleeve according to the third aspect of the invention is suitable for use as the protective sleeve of the aircraft wing according to the first embodiment of the invention. The cable harness sleeve according to the third aspect of the invention may have any of the features of the cable harness sleeve of the aircraft wing described above in relation to the first aspect of the invention.

The protective sleeve may comprise a second projecting member that projects from an inner surface of the protective sleeve on the second opposing part. In the secured configuration of the protective sleeve, the second projecting member may abut with the first opposing part of the protective sleeve.

The outer wall of the protective sleeve may have a first side portion and an opposite second side portion. The first opposing part may connect the first side portion with the second side portion on an upper side of the sleeve. The second opposing part may connect the first side portion with the second side portion on an opposite lower side of the sleeve. An internal height of the first side portion may be greater than an internal height of the second side portion such that, when the sleeve is in the secured configuration, the first channel has a larger internal dimension than the second channel.

The sleeve may define a main channel when the sleeve is not in the secured configuration. The main channel may be at least partially defined by the first side portion and the second side portion. In the secured configuration of the sleeve, the first side portion may at least partially define the first channel. In the secured configuration of the sleeve, the second side portion may at least partially define the second channel.

A first plurality of securing portions may be formed in the first opposing portion, the securing portions of the first plurality being spaced apart along the first opposing portion. A second plurality of securing portions may be formed in the second opposing portion, the securing portions of the second plurality being spaced apart along the second opposing portion. The first plurality of securing portions may be arranged with respect to the second plurality of securing portions such that, in the secured configuration of the cable harness, the securing portions of the first plurality are aligned with the securing portions of the second plurality. The securing portions may be holes and, as such, the first opposing portion may be secured to the second opposing portion using fasteners, each fastener passing through both the first opposing portion and the second opposing portion. In some embodiments, one of the plurality of securing portions may comprise fasteners. The fasteners may be integrally formed with the wall of the sleeve.

According to a fourth aspect, the present invention provides another cable harness sleeve configured for use on a folding wing. The cable harness sleeve comprises a sheet, the sheet comprises a first portion, an intermediate portion, and a second portion arranged along a transverse direction of the sheet, the intermediate portion being positioned between the first portion and the second portion. A first plurality of securing portions are spaced apart on an end of the first portion of the sheet in a longitudinal direction of the sheet, a second plurality of securing portions are spaced apart on the intermediate portion of the sheet in a longitudinal direction of the sheet, and a third plurality of securing portions are spaced apart on an end of the second portion of the sheet in a longitudinal direction of the sheet. The sheet is configurable to a secured configuration in which the first portion of the sheet is folded about an axis parallel with a longitudinal direction to a position in which the securing portions of the first plurality are aligned with the securing portions of the second plurality such that the first portion of the sheet at least partially defines a first channel; the second portion of the sheet is folded about an axis parallel with a longitudinal direction to a position in which the securing portions of the third plurality are aligned with the securing portions of the second plurality such that the second portion of the sheet at least partially defines a second channel; and the intermediate portion is positioned between the first channel and the second channel to space the first channel apart from the second channel.

The cable harness sleeve according to the fourth aspect of the invention is suitable for use as the protective sleeve of the aircraft wing according to the first embodiment of the invention. The cable harness sleeve according to the fourth aspect of the invention may have any of the features of the cable harness sleeve of the aircraft wing described above in relation to the first aspect of the invention.

The sheet may have a thickness. The thickness of the sheet may be substantially constant. The thickness of the first portion of the sheet, the second portion of the sheet, and the intermediate portion of the sheet may be approximately equal to one another. In some embodiments, the thickness of the intermediate portion of the sheet may be greater than the thickness of the first portion or second portion.

The securing portions may be holes. In some embodiments, the securing portions may comprise fasteners. The fasteners may be integrally formed with the sheet.

According to another aspect of the invention, there is provided a sleeve for receiving a first cable harness including plurality of high-voltage cables and a second cable harness including a plurality of low voltage cables. The sleeve may be formed from fluorosilicone polymer. The cable harnesses extend between a fixed wing and a moveable wing tip device on an aircraft. The sleeve comprises a first, circular, channel for receiving the first cable harness and a second, circular, channel for receiving the second cable harness. The two channels are coupled such that each cable harness is substantially prevented from moving towards or away from the adjacent cable harness. The sleeve includes a slit along each channel such that the sleeve may be removed from the harnesses.

It will of course be appreciated that features described in relation to one aspect of the present invention may be incorporated into any and all other aspects of the present invention. For example, features described in relation to protective sleeves of the third and fourth embodiments of the invention may also be applicable to the aircraft wing of the first embodiment of the invention and vice versa.

DESCRIPTION OF THE DRAWINGS

Embodiments of the present disclosure will now be described by way of example only with reference to the accompanying schematic drawings of which:

FIG. 3 is a perspective cut away view of the trailing edge at the joint in the aircraft showing a cable harness sleeve extending between the fixed wing and the wing tip device;

FIGS. 4A and 4B are magnified views of either end of the cable harness sleeve shown in FIG. 3;

DETAILED DESCRIPTION

Figure 1A:
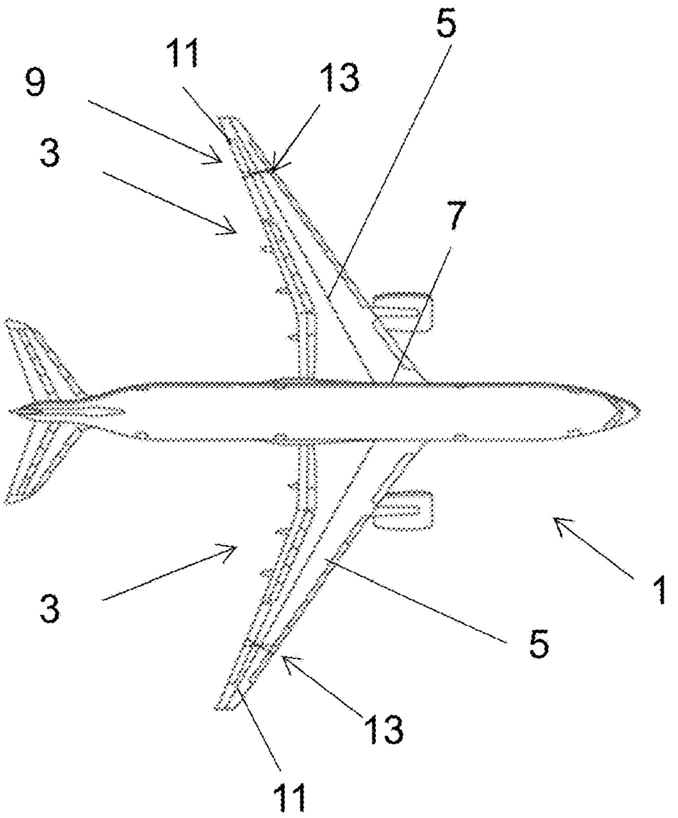
FIGS. 1A and 1B show a plan view and a frontal view respectively, of an aircraft according to an embodiment of the invention.
Figure 1B:
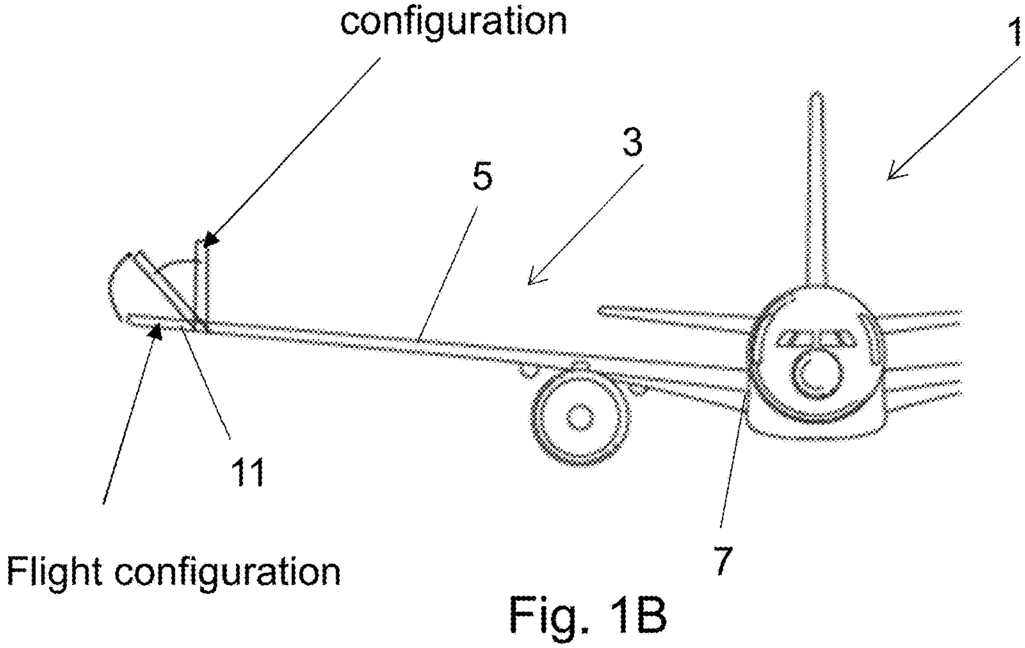

FIGS. 1A and 1B show a plan view and a front view of an aircraft 1 according to an embodiment of the invention. The aircraft 1 comprises two main wings 3 extending outwardly from the fuselage (only one wing is fully visible in FIG. 1B). Each wing 3 comprises a fixed wing 5 extending from the root 7 to the tip 9. At the tip 9 of the fixed wing 5, the wing 3 also comprises a moveable wing tip device 11. In this embodiment, the wing tip device 11 comprises a planar wing tip extension. The wing tip device 11 is rotatably mounted on a hinge joint 13, having a hinge axis. As such, the wing tip device 11 is able to rotate about the hinge joint 13 relative to the fixed wing 5.

The aircraft 1 also comprises an actuator assembly (not shown) operable to rotate the wing tip device 5 about the hinge joint 13. Referring to FIG. 1B, the wing tip device 11 is rotatable about the hinge joint 13 between a flight configuration, and a ground configuration. FIG. 1B also shows the wing tip device 11 when moving part-way between these two configurations.

In the flight configuration, the wing tip device 11 is an extension of the fixed wing 5. Accordingly, the upper and lower surfaces of the fixed wing 5 are continuous with the upper and lower surfaces of the wing tip device 11. The leading and trailing edges of the fixed wing 5 are also continuous with the respective leading and trailing edges of the wing tip device 11 (see FIG. 1A). Such an arrangement is beneficial as it provides a relatively large wing span during flight, thereby providing an aerodynamically efficient aircraft.

The wing tip device 11 is rotatable, upwards, from the flight configuration to a ground configuration in which the wing tip device 11 is rotated, to a substantially upright position (shown in FIG. 1B). The wing tip device 11 is moveable to this configuration when the aircraft 1 is on the ground. Once rotated to such a position, the span of the aircraft 1 is sufficient to meet airport compatibility gate limits. Thus, the aircraft 1 of the first embodiment can have a large span (exceeding gate limits) during flight, but is still able to comply with gate limits when on the ground.

Aspects of the present invention relate to the cable harnesses 15*a/b* extending from the fixed wing 5 into the wing tip device 11. These will now be described in more detail with reference to FIGS. 2A and 2B.

Figure 2A:
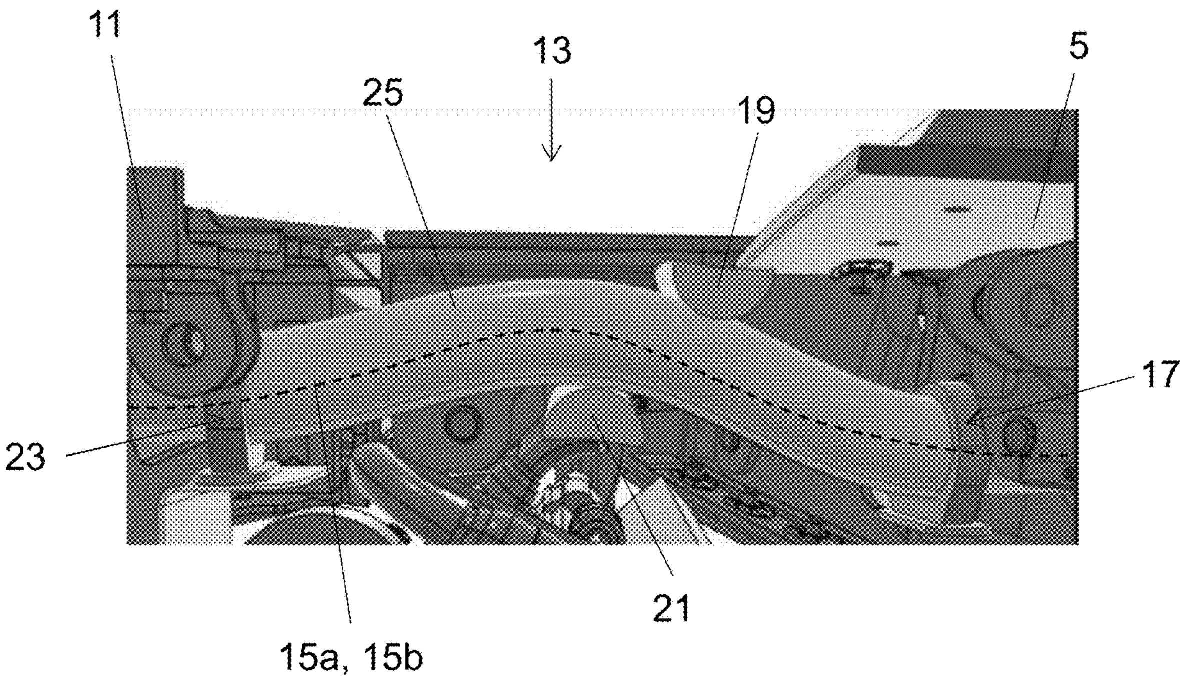
FIGS. 2A and 2B are cut-away views of the leading edge of the wing at the joint between the fixed wing and the wing tip device of the aircraft showing a cable harness sleeve extending between the fixed wing and the wing tip device when the wing tip device is in the flight configuration (FIG. 2A) and ground configuration (FIG. 2B), respectively.

FIG. 2A is a view of the leading edge of the wing, at hinge joint 13 but with some of the wing structure (namely the wing skin around the leading edge) removed for clarity. Two cable harnesses 15*a* and 15*b* located within the inside of the fixed wing each extend from the fuselage to the tip 9 of the fixed wing 5. The route of the cable harnesses 15*a/b* is illustrated schematically using the dashed-line, as the harnesses themselves are mostly hidden by surrounding structure and are aligned one behind the other in the view shown.

The cable harnesses 15*a* and 15*b*, as is known in cable harnesses per se in the art, each contain a multiplicity of sheathed electrical cables (not shown individually in the Figures). Each of the electrical cables performs a different function (for example, to supply electrical power to different devices in the aircraft, or to transmit data signals to/from sensors and devices in the aircraft). The cables are collected together in an assembly to form each harness, that is then routed in a suitable manner through the wing. The two harnesses 15*a*, 15*b* extend largely parallel to each other.

FIG. 2A shows the aircraft with the wing tip device 11 in the flight configuration. The cable harnesses 15*a/b* emerge from the fixed wing at a first end 17, and then cross the hinge joint 13 via a bend between two sleeve guides 19 and 21 (described in further detail below). The harnesses 15*a/b* enter the wing tip device 11 at a second end 23, and then continue into the wing tip device 11 where the cables then connect to a variety of devices and sensors.

Figure 2B:
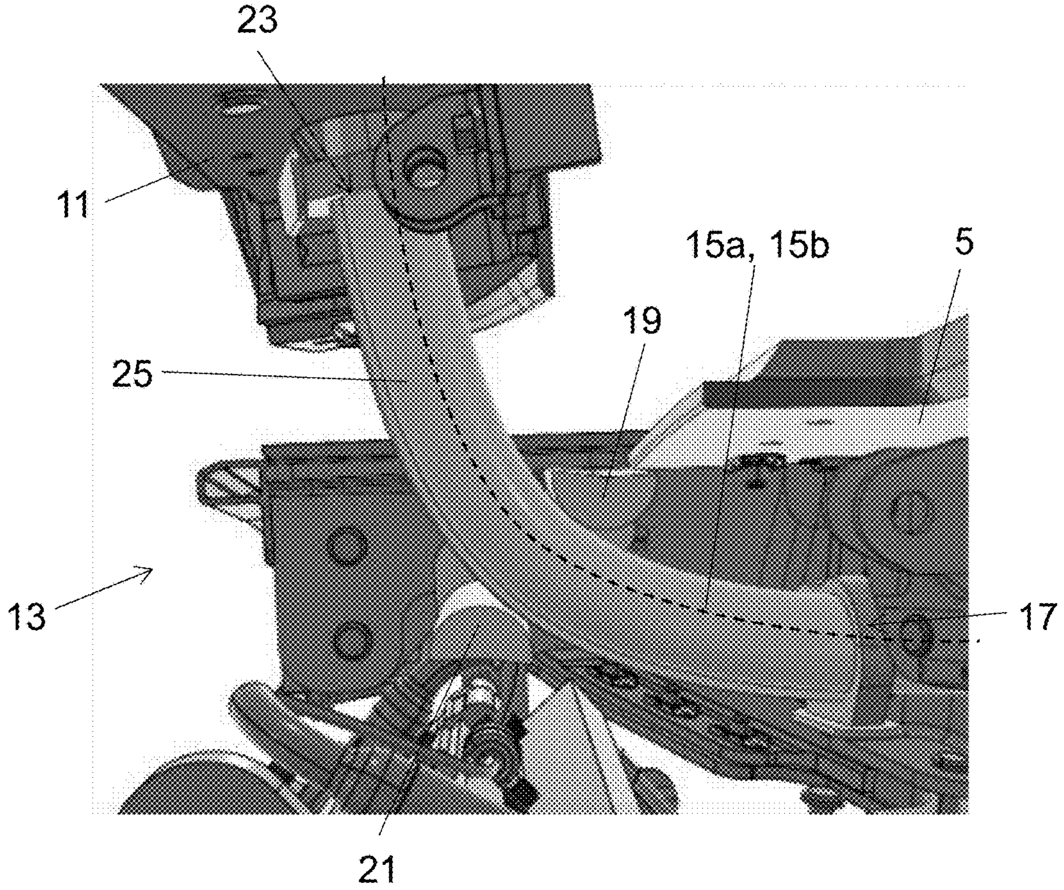

FIG. 2B shows the aircraft with the wing tip device 11 in the ground configuration. As can be seen from a comparison with FIG. 2A, the first end 17 remains fixed relative to the fixed wing 5 and the second end 23 remains fixed relative to the wing tip device 11. Across the joint 13, the cable harnesses flex 15*a/b* into an upward curve, but remain between the sleeve guides 19 and 21.

FIGS. 2A and 2B show the leading edge of the wing. However, another pair of harnesses and a corresponding sleeve is also present at the trailing edge. These are shown in FIG. 3 and FIG. 4A/4B. The arrangement of harnesses at both the leading and trailing edges ensures redundancy should one of the arrangements fail. The arrangement at the leading edge is broadly identical to the arrangement described at the trailing edge (other than any differences discussed herein). For clarity, aspects of the invention are described below with reference to one of the sleeves, but those aspects are equally applicable to the other sleeve unless indicated otherwise.

In general terms, placing cable harnesses across this joint 13 between the fixed wing 5 and the moveable wing tip device 11 presents a number of challenges. The arrangement in the aircraft 1 seeks to address these challenges. In that respect, the aircraft includes a protective sleeve 25 at both the leading and trailing edges that surrounds the respective cable harnesses 15*a/b* as they extend across the joint.

The sleeve 25 at the leading edge (see FIGS. 2A and 2B) extends from the first end 17 (where the harnesses 15*a/b* emerge from the fixed wing 5) to the second end 23 (where the harnesses 15*a/b* enter the wing tip device 11). The region between these two end locations has been found to be especially exposed to potentially harsh environmental conditions (for example extremes of temperature, potentially aggressive substances such as grease, oil, de-icing fluid etc.). Furthermore, as the wing tip device moves between the flight and ground configurations, the sleeve 25 flexes to accommodate this movement, and may therefore be susceptible to fatigue wear.

As described in more detail below, the sleeve 25 is removeable from the harnesses 15*a/b*. Importantly, the sleeve 25 is also a relatively short length and only extends between either of the ends across the joint. Referring now to FIG. 3 and the magnified views (FIGS. 4A and 4B) of either end of the sleeve, a first end 17 of the sleeve 25 is fixedly held in place by a first clamp 39. The first clamp 39 comprises a base portion 39*a* mounted on the fixed wing 5, and a clamping portion 39*b* arranged to fixedly hold the end of the sleeve in place. The clamping portion 39*b* is held in place via two screw threaded fastenings 51. The second end 23 of the sleeve 25 is fixedly held in place by a second clamp 43. This clamp 43 also comprises a base portion 43*a*, but it is instead mounted on the wing tip device 11. The second clamp 43 also comprises a clamping portion 43*b*, but instead of screw headed fastenings, this clamp is held together via a snap fit, and can be removed using a suitable tool. In other embodiments, each end may be held in place by clamps of the same design both ends. In the above-mentioned embodiment the clamping portions and the base portions are formed from a plastics material.

To remove the sleeve, each clamp 39, 43 is released, and then the sleeve 25 is pulled away from each harness via the slits in the manner described above.

Having a removeable sleeve has been found to be especially beneficial because it may allow the sleeve to be installed, and/or removed, for example for replacement or repair, without needing to remove the harness. Furthermore, ensuring this particular length of the sleeve (i.e. the length spanning the joint) is removable has been found to be especially beneficial because it is this length that is most likely to be exposed to potential damage or wear. Furthermore, this length tends to be readily accessible when the wing tip device is in the ground configuration.

Figure 5A:
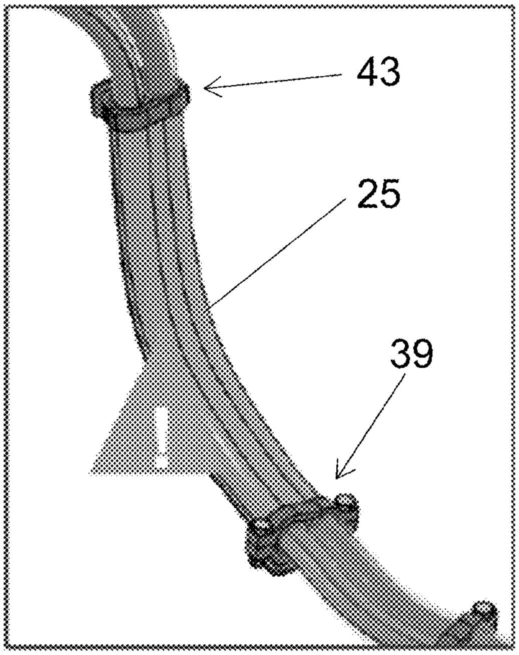
FIGS. 5A to 5D show stages of removing and replacing a cable harness sleeve.

A method of removing a sleeve 25 is illustrated schematically in FIGS. 5A to 5D. FIG. 5A shows the sleeve 25 installed on two harnesses 15*a*, 15*b* and fixedly held in place with clamps 39, 43. For multiple reasons, the sleeve may require replacement or repair, in which case it may be beneficial to remove the sleeve 25 from the harnesses 15*a/b*. While the movement of the wing tip device is not shown, an initial step of servicing the harness is to move the wing tip device to a ground configuration, shown by the relative position of the clamps in FIGS. 5A to 5D. This may provide easier access to the sleeve and/or clamps compared to when the wing tip device is in the flight configuration.

Figure 5B:
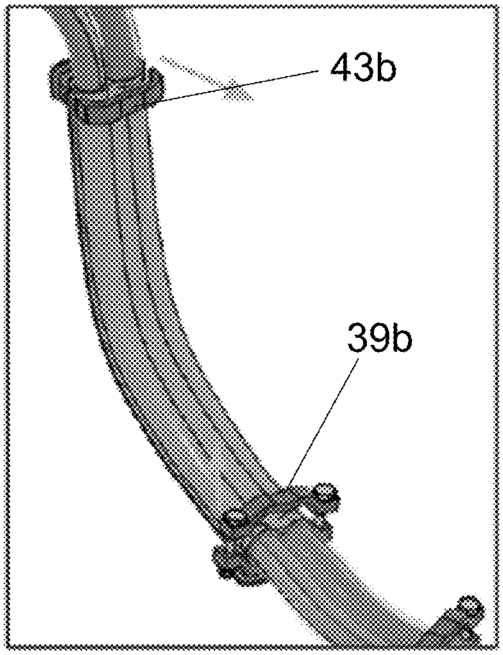
Figure 5C:
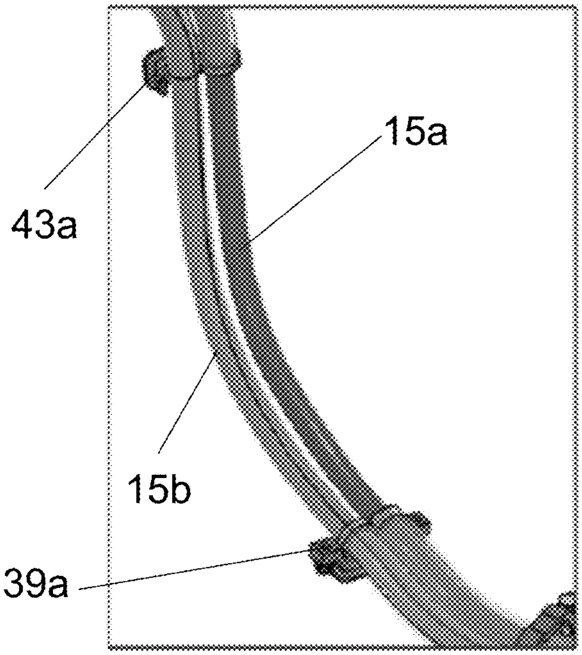
Figure 5D:
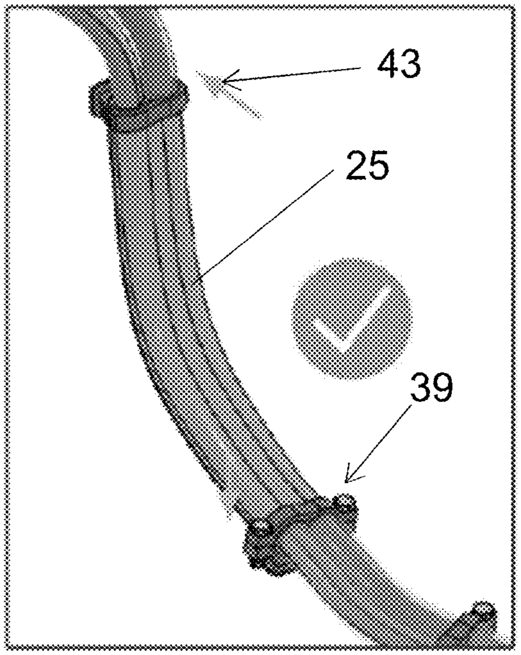

Referring to FIG. 5B, a next step in removing the sleeve is to unclamp the ends of the sleeve by separating the clamping portions 39*b*, 43*b* from their respective base portions 39*a*, 43*a*. Unclamping the ends of the sleeve allows for removal of the sleeve 25, from the harnesses. The method of removing the sleeve 25 from the harnesses will depend on the configuration of the sleeve 25. Examples of suitable sleeves in accordance with the present invention are described in more detail below. Removal of the sleeve 25 results in the harnesses 15*a*, 15*b* being exposed and resting on the base portions 39*a*, 43*a*, as shown in FIG. 5C. The original sleeve may then be repaired or replaced with a new sleeve. To fit a replacement/repaired protective sleeve, the process is effectively reversed. With the new sleeve 25 installed on the harnesses 15*a*, 15*b*, the ends are then re-clamped as shown in FIG. 5D, by reuniting the clamping portions 39*b*, 43*b* with the base portions 39*a*, 43*a*.

Referring back to FIGS. 2A and 2B, the aircraft 1 (at both the leading edge and the trailing edge) comprises an upper sleeve guide 19 and a lower sleeve guide 21. Both of these guides are mounted onto the fixed wing 3 and are offset in a vertical direction from a line joining each end 17,23 of the sleeve 25 (when the wing tip device is in the flight configuration). In this manner, the sleeve 25 is fed between the two sleeve guides 19, 21 and the natural resilience of the sleeve is such that it is urged against both sleeve guides. This constrains vibrational movement, and therefore minimises the risk of damage arising due to vibration/movement of the sleeve. The sleeve guides 19, 21 also act to constrain the movement of the sleeve 25 as it flexes during movement of the wing tip device 11 between the flight and ground configurations. As illustrated in FIGS. 2A and 2B, the upper sleeve guide 19 fixes the location about which the sleeve 25 bends upwardly during movement to the ground configuration. Likewise, the lower sleeve guide 21 fixed the location about which the sleeve 25 bends downwardly during movement to the flight configuration.

Figure 6:
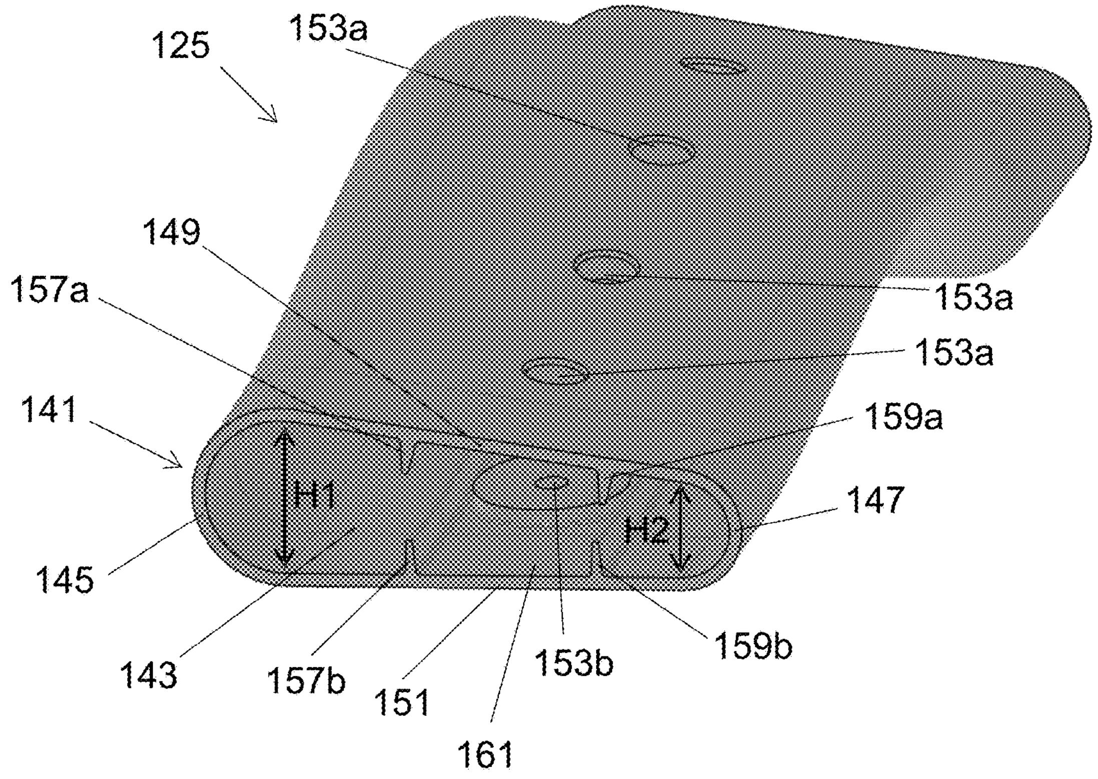
FIG. 6 is a perspective view of a cable harness sleeve according to an embodiment of the invention.

A sleeve 125 according to a first embodiment of the invention, which is suitable for use as the sleeve 25 described above, is shown in FIG. 6. The sleeve 125 has a closed cross-section provided by a continuous outer wall 141 that surrounds and defines an internal channel 143. The outer wall 141 comprises a curved first side portion 145 and an opposite curved second side portion 147. An upper opposing portion 149 of the wall 145 connects the first side portion 145 with the second side portion 147 on an upper side of the sleeve and a lower opposing portion 151 connects the first side portion 145 with the second side portion 147 on the lower side of the sleeve 125. In the presently described embodiment of the invention, the internal height H1 of the first side portion 145 is greater than the internal height H2 of the second side portion 147 and, accordingly, the radius of curvature of the first side portion 145 is greater than the radius of curvature of the second side portion 147.

A plurality of holes 153*a* are formed in the upper opposing portion 149, the holes 153*a* being spaced apart on the upper opposing portion 149 along a longitudinal direction of the sleeve 125. A plurality of holes 153*b* are also formed in the lower opposing portion 151, the holes 153*a*, 153*b* are positioned such that each hole 153*b* formed in the lower opposing portion 151 is aligned with a corresponding hole 153*a* formed in the upper opposing portion 151 (note that only one hole 153*b* can be seen in the lower opposing portion 151 in FIG. 6).

The sleeve 125 also comprises two pairs of projecting members in the form of opposing ribs 157*a/b*, 159*a/b* which run along the length of the sleeve and project from an inner surface 161 of the outer wall 141 into the channel 143 of the sleeve 125. Each pair of projecting members comprises a first rib 157*a*, 159*a* which projects from the upper opposing portion 149 into the channel 143 towards the lower opposing portion 151, and a second rib 157*b*, 159*b* which projects from the lower opposing portion 151 into the channel 143 towards the upper opposing portion 149. The first pair of ribs 157*a/b* are positioned at the left ends of the respective upper and lower opposing portions 149, 151, where the upper and lower opposing portions 149, 151 meet the first side portion 145. The second pair of ribs 159*a/b* are positioned at the right ends of the respective upper and the lower opposing portions 149, 151, where the upper and lower opposing portion 149, 151 meet the right side portion 147.

The process of installing the sleeve 125 will now be described. Because the sleeve 125 has a closed cross-section which cannot be opened, the sleeve 125 must be installed by inserting the harnesses 15*a/b* into an end of the channel 143 and passing the harnesses 15*a/b* through the channel 143, along the longitudinal direction of the sleeve. The harnesses 15*a/b* must be therefore be electrically disconnected from at least one of the wing or wing tip in order to install the sleeve 125. However, in other embodiments of the invention, the closed cross-section of the sleeve could be openable. For example, the upper or lower opposing portion could be formed by two or more overlapping parts which are openable to provide a gap in the outer wall of the sleeve so that the harnesses 15*a/b* can be inserted into the channel through the gap in the outer wall of the sleeve.

In the presently described embodiment, the first side portion 145 of the sleeve 125 has been provided with a greater height H1 than the height H2 of the second side portion 147 to accommodate for the differing sizes of the first harness 15*a* and the second harness 15*b*. The first harness 15*a*, which has a larger diameter than the second harness 15*a*, is inserted into the part of the channel 143 formed by the first side portion 145 and the second harness 15*b* is inserted into the part of the channel 143 defined by the second side portion 147.

Figure 7:
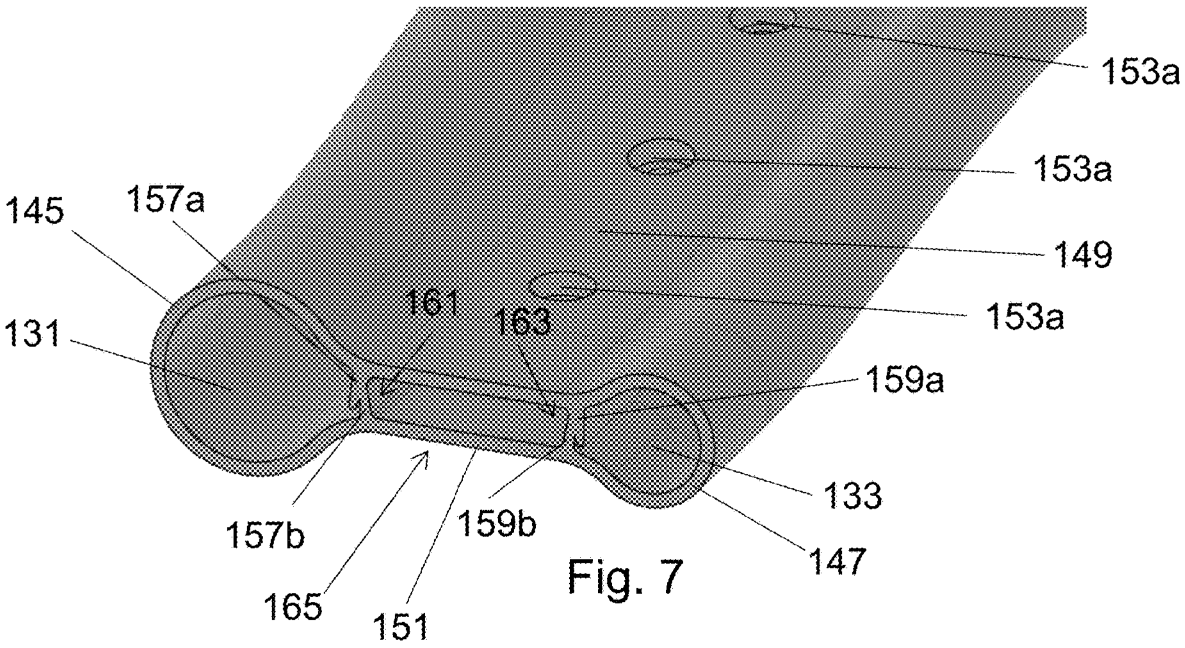
FIG. 7 shows the cable harness sleeve of FIG. 6 where the cable harness sleeve has been deformed to a secured configuration.
Figure 8:
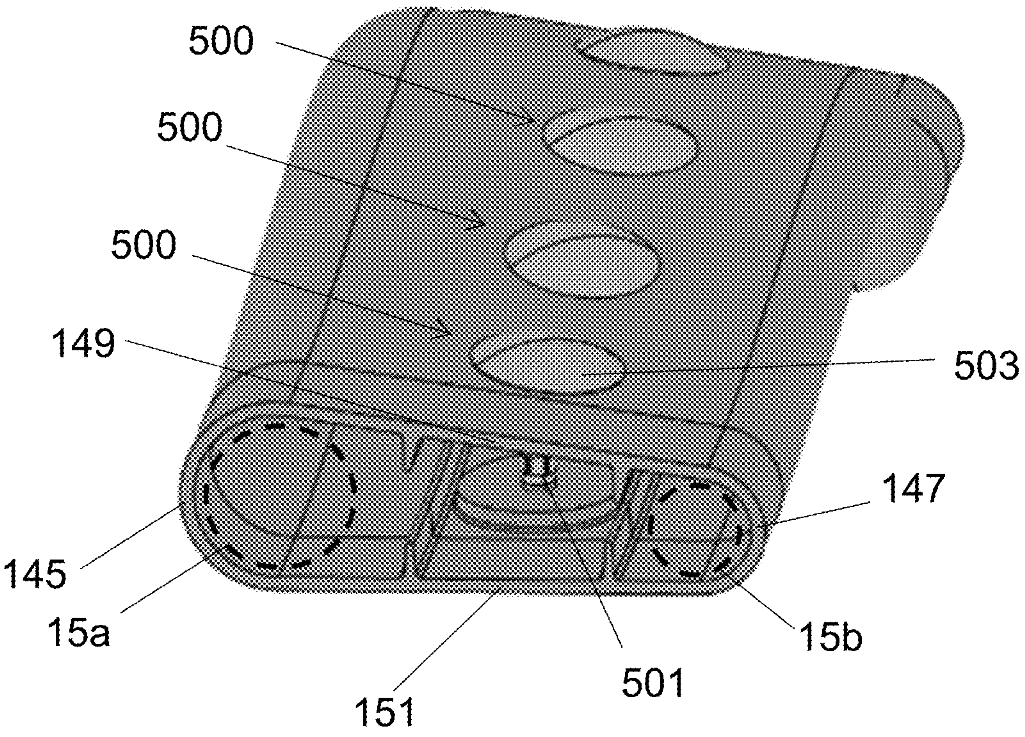
FIG. 8 shows the cable harness sleeve of FIG. 6 with fasteners in place, ready to secure the cable harness sleeve in a secured configuration.

With the harnesses 15*a/b* in place within the channel 143, the sleeve 125 can then be secured to the harnesses 15*a/b* by configuring the sleeve to a secured configuration by moving the upper intermediate portion 149 and the lower intermediate portion 151 towards one another such that the respective first ribs 157*a*, 159*a* abut with the respective second ribs 157*b*, 159*b*, as shown in FIG. 7. The upper intermediate portion 149 is then secured to the lower intermediate portion 151 via plurality of fasteners 500, with each fastener being received within a hole 153*a* in the upper intermediate portion 149 and a corresponding aligned hole 153*b* in the lower intermediate portion 151, as shown in FIG. 8 (note that in FIG. 8, the fasteners 500 are shown in an unfastened state and the sleeve 125 is shown in an undeformed state).

Figure 9:
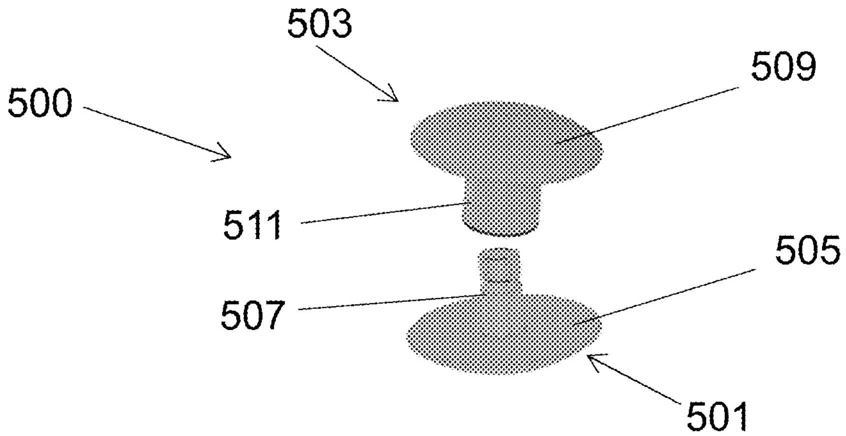
FIG. 9 is a perspective view of a fastener suitable for securing the cable harness sleeve of FIG. 6 in a secured configuration.

In this case, the fasteners 500 used are two-part snap-fit fasteners 500 of the type shown in FIG. 9. Each fastener comprises a first half 501 and a second half 503. The first half 501 comprises a head 505 and a male portion 507 which projects from the head 505. The second half 503 comprises a head 509 and a female portion 511 which is configured to receive and snap-fit with the male portion 507 of the first half 501.

As can be seen in FIG. 7, in the secured configuration of the sleeve 125, the first side portion 145 forms a first channel 131 in which the first harness 15*a* is received and the second side portion 147 forms a second channel 133 in which the second harness 15*b* is received. Each channel 131/133 has a circular outer profile, which minimises the space required to accommodate the harnesses 15*a/b* within the wing and maximises the clearance with surrounding structures.

Each channel 131, 133 is sized such that it includes a small tolerance between the outer diameter of the harness 15*a/b* and the wall 141 of sleeve 125. This mitigates chaffing between the harness 15*a/b* and the sleeve 125.

The sleeve 125 comprises a non-conducting flexible material, such as a fluorosilicone polymer. The fluorosilicone polymer may be FVMQ. The fluorosilicone polymer has a hardness as measured on the Shore A hardness scale of about 70. Such a hardness may be particularly effective in dealing with the multiple bending and unbending procedures to which a folding wingtip is subjected. In addition, the FVMQ material has been found to be especially robust in coping with the harsh environmental conditions that it may be exposed to at the tip of the wing.

In the presently described embodiment, the thickness of the outer wall 141 of the sleeve 125 is approximately 3 millimetres, which is well above the thickness required to ensure arcing protection. It has been found that a thickness of at least 0.79 mm of the FVMQ material is required to ensure arc protection, so embodiments of the invention may have a minimum sleeve thickness of at least this value.

As can be seen in FIG. 7, the abutting pairs of ribs 157*a/b*, 159*a/b* each form a wall 161, 163 which partially defines closes the respective first and second channels 131, 133. The upper opposing part 149 and the lower opposing part 151, which are secured together form a webbing region 165 between the first channel 131 and the second channel 133.

In the presently described embodiment of the invention, the first harness 15*a* contains high voltage cables for transmitting a high voltage (270V) supply, whereas the second harness 15*b* contains only low voltage cables arranged to transmit a low voltage (28V) supply and data signals. The presence of a high voltage conductor presents some specific challenges. In particular, there is a need to minimise the risk of arcing, and to minimise the risk of scenarios that might create an arcing risk. The sleeve 125 according to the presently described embodiment has some features to address those challenges. In particular, the walls 161, 163 formed by the abutting ribs 157*a/b*, 159*a/b* form a barrier between the first cable harness 15*a* and the second cable harness 15*b*. Furthermore, the webbing region 165 formed by the upper opposing part 149 and the lower opposing part 151 holds the first channel 131 and the second channel 133 spaced apart from one another in a fixed the position. By using a single sleeve 125 in this manner, the harnesses 15*a*/15*b* can be positioned significantly closer to one another than a scenario in which the harnesses 15*a/b* are held in separate, independent sleeves. This is especially beneficial in the area of the wing tip where space is at a premium.

A sleeve 225 according to a second embodiment of the invention, which is also suitable for use as the sleeve 25 of the aircraft 1 described above, is shown in FIG. 10 and FIG. 11. In this case the sleeve 225 is formed from a single sheet 227 of FMVQ. In other embodiments the sleeve 225 may be formed from or another non-conducting flexible material. The sheet 227 comprises a first portion 245, an intermediate portion 249, and a second portion 247 arranged along a transverse direction of the sheet, with the intermediate portion 249 being positioned between the first portion 245 and the second portion 247. The first portion 247 has a width W in the transverse direction of the sheet 227 which is greater than the width of the second portion 247. A first plurality of holes 253*a* are spaced apart along a longitudinal direction of the sheet 227 on an end of the first portion 245 of the sheet, the longitudinal direction of the sheet being oriented perpendicular to the transverse direction of the sheet 227. A second plurality of holes 253*b* are spaced apart along a longitudinal direction of the sheet 227 on an end of the second portion 247 of the sheet 227 and a third plurality of holes 253*c* are spaced apart along the longitudinal direction on the intermediate portion 249 of the sheet 227. The holes 253*c* in the intermediate portion 249 being located at the centre of the intermediate portion along the transverse direction of the sheet 227.

The thickness T of the intermediate portion is approximately 2 millimetres, which is approximately twice the thickness of the first portion and the second portion, which are each approximately 1 millimetre thick. In other embodiments of the invention, the thicknesses of the respective portions of the sheet may of course be different. It will be appreciated that in some embodiments, the sheet may of course have a substantially constant thickness such that the thicknesses of the first portion and the second portion are equal to each other and equal to the thickness of the intermediate portion. In these cases, the thickness of the sheet may be determined by the required thickness of the intermediate portion, which forms a barrier between the first cable harness and the second cable harness in use. For example, in some embodiments, the thickness of the intermediate portion may need to be at least 2 millimetres, therefore the sheet may have a substantially constant thickness of 2 millimetres in those embodiments.

Figure 11:
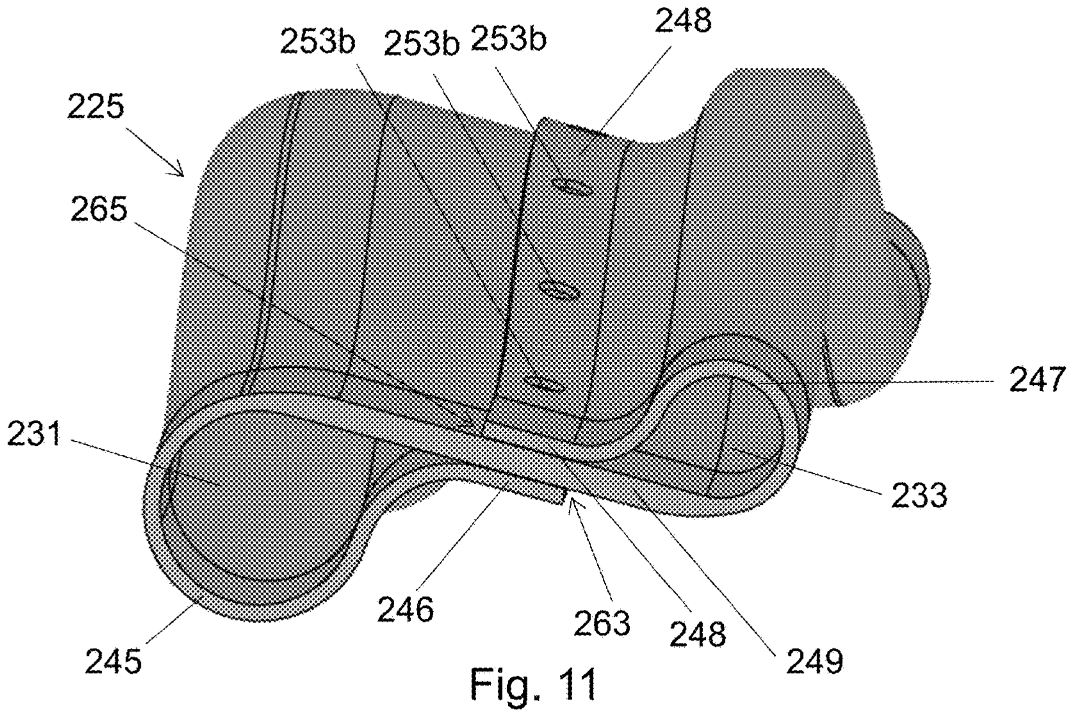
FIG. 11 shows the cable harness sleeve of FIG. 10 where the cable harness sleeve has been deformed to a secured configuration.

The sheet 227 is configurable to a secured configuration shown in FIG. 11 by folding the first portion 245 of the sheet about an axis parallel with the longitudinal direction to a position in which the end 246 of the first portion 245 rests against the intermediate portion 249 on a first side of the intermediate portion 249 and the holes 253*a* of the first plurality are aligned with the holes of the third plurality 253*c*, such that the first portion 245 of the sheet defines a first channel 231. The second portion 247 of the sheet 227 is folded about an axis parallel with the longitudinal direction to a position in which the end 248 of the second portion 247 rests against the intermediate portion 249 on an opposite second side of the intermediate portion 249 and the holes 253*b* of the second plurality are also aligned with the holes 253*c* of the third plurality such that the second portion 247 of the sheet 227 defines a second channel 233. In the secured configuration of the sleeve 225, the end 246 of the first portion 245 of the sheet 227 forms an opposing part that is secured to an opposing part formed by the intermediate portion 249. Similarly, the end 248 of the second portion 247 of the sheet 227 forms an opposing part that is secured to an opposing part that is formed by the intermediate portion 249.

Figure 10:
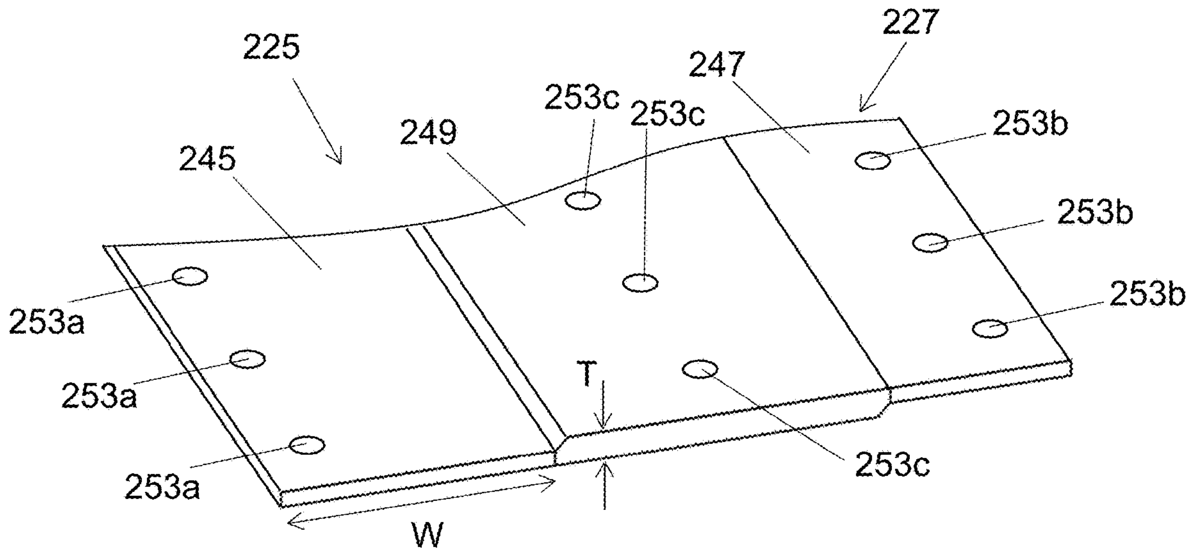
FIG. 10 is a perspective view of a cable harness sleeve according to another embodiment of the invention.

The sleeve 225 is secured in the configuration shown in FIG. 10 using fasteners. The fasteners may be fasteners 500 of the type described above with reference to FIG. 9, or another type of fastener. The holes 253*a/b/c* of the first, second, and third plurality are aligned such that a single fastener can be passed through the first portion 245, the intermediate portion 249, and the second intermediate portion 247 to fasten the respective portions 245, 247, 249 together.

In order to install the sleeve 225, the first portion 245 is wrapped around the first harness 15*a* in a first direction (anticlockwise in the frame of reference of FIG. 10 and FIG. 11) and the second portion 247 is wrapped around the second harness 15*b* also in the first direction. The first portion 245, intermediate portion 249, and the third portion 247 are then secured together with fasteners. The longer width W of the first portion 245 in the transverse direction provides the first channel 231 with a larger diameter, which is suitable for accommodating the first harness 15*a*, which has a greater diameter than the second harness 15*b*. In embodiments, the width of the respective first and section portions may be determined by the diameter of the harness the sleeve is configured to carry.

In some embodiments, the sheet 227 may be pre-formed in the configuration shown in FIG. 11 in which the first and second portions 245, 247 form first and second channels 231, 233. In these embodiments, the sleeve 225 may be installed by inserting the first and second harnesses 15*a/b* into their respective first and second channels 231, 233 via respective slits 263, 265. A first slit 263 being formed between the end 246 of the first portion 245 and the intermediate portion 249 and a second slit 265 being formed between the end 248 of the second portion 247 and the intermediate portion 249. A benefit of using a sleeve made from FMVQ in this scenario is that it allows the sleeve 225 to resiliently deform to open the first slit 263 and the second slit 265 such that the sleeve 225 can readily be installed and removed.

An advantage of the sleeve 225 of the second embodiment is that the sleeve 225 can either be installed without having to electrically disconnect the harnesses 15*a/b*, because the sleeve 225 can be secured by simply wrapping the sleeve around the harnesses 15*a/b* or, where the sheet 227 is preformed to the configuration shown in FIG. 11, by inserting the cable harnesses 15*a/b* through the slits 263, 265 formed along the longitudinal direction of the sleeve.

As can be seen in FIG. 11, in the secured configuration of the sleeve 225, the first channel 231 which contains the harness 15*a* is positioned on a first side of the intermediate portion 249 (the lower side, in the configuration as shown in FIG. 11) and the second channel 233 is positioned on an opposite second side of the intermediate portion 249 (the upper side in the configuration as shown in FIG. 11). The intermediate portion 249 therefore forms a barrier between the first cable harness 15*a* and second cable harness 15*b* in use which mitigates the risk of arcing. Furthermore, the intermediate portion 249 also forms part of a webbing region that holds the first channel 231 and the second channel 233 spaced apart from one another in a fixed position. By using a single sleeve 225 in this manner, the harnesses 15*a*/15*b* can be positioned significantly closer to one another than a scenario in which the harnesses 15*a/b* are held in separate, independent sleeves. This is especially beneficial in the area of the wing tip where space is at a premium.

In other embodiments of the invention, the sleeve 225 may be configured such that the first portion and second portion of the sheet are folded in opposite directions such that the respective ends of the first and second portions both rest against the same side of the intermediate portion (or the sheet may be pre-formed in this configuration). Alternatively or additionally, in embodiments of the invention the respective ends of the first and second portions may be securable only to the intermediate portion, rather than the respective ends of the first and second portions being secured to each other, as well as the intermediate portion.

Figure 12:
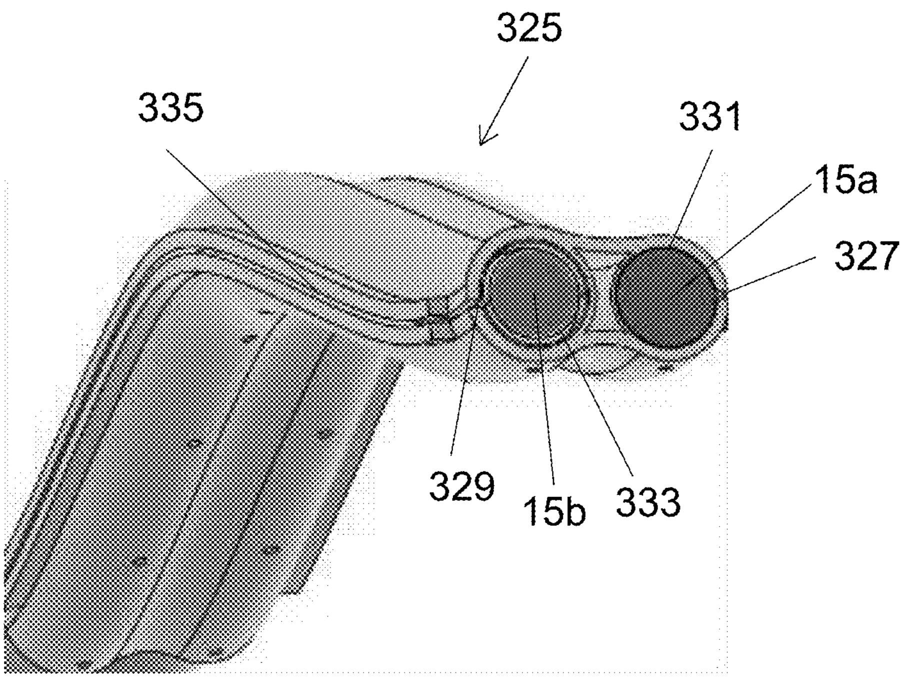
FIG. 12 is a cross-sectional view of another example cable harness sleeve.

An example of a further sleeve 325 which is suitable for use as the sleeve 25 described above, is shown in FIG. 12. The sleeve 325 comprises a first channel 331 in which the first harness 15*a* is received, and a second channel 333 in which the second harness 15*b* is received. A first slit 327 extends along the side of the sleeve 325 in a longitudinal direction of the sleeve and extends along the full length of the first channel 331. A corresponding second slit 329 is located on the opposing side of the sleeve 325 and extends in a longitudinal direction of the sleeve 325 along the full length of the second channel 333.

The sleeve 325 is formed of FMVQ. Each harness 15*a*/15*b* can be installed or removed from its respective channel 331, 333 by peeling the slit 335, 337 open and inserting the harness 15*a*/15*b* or by simply pulling the sleeve away from the harness.

Figure 13A:
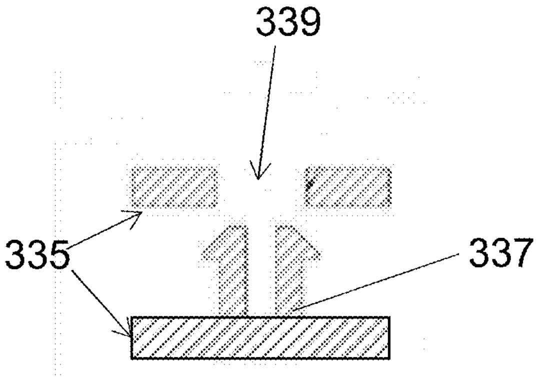
FIGS. 13A and 13B show the arrangement of closure tabs on the cable harness sleeve shown in FIG. 12.
Figure 13B:
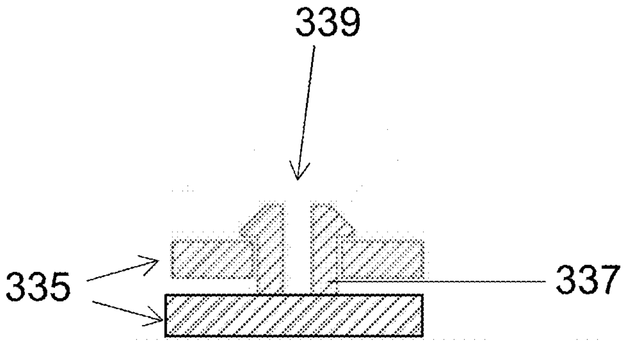

To configure the sleeve 325 to a secure configuration in which the harnesses 15*a/b* are secured withing the sleeve 325, the sleeve 325 comprises a pair of closure tabs 335 extending either side of each slit 327, 329. The closure tabs 335 are held together by a series of releasable fasteners 337, which are shown in FIGS. 13A and 13B. FIG. 13A shows a pair of closure tabs 335 in and open configuration open and FIG. 13B shows a pair of closure tabs 335 in a closed configuration. One of the closure tabs 335 in each pair has a plurality of integrally moulded fasteners 337 spaced apart along its length in the longitudinal direction of the sleeve. The fasteners 337 include a mushroom head which can be inserted into a corresponding hole 339 on the opposing closure tab. Once inserted through the opening, as shown in FIG. 13B, the mushroom head prevents the fastener 337 being pulled back through the hole 339 and thereby securely holds the closure tabs 335 together. Each fastener 337 is nonetheless able to be extracted from the opening 339 when necessary, for example to open the slit, due to the resiliently deformable nature of the sleeve material permitting manual deformation of the mushroom head such that the mushroom head can be pulled through its respective hole. Fasteners 337 of this type are of course suitable for use with other types of sleeve, such as the sleeves 125, 224 described above.

Figure 14:
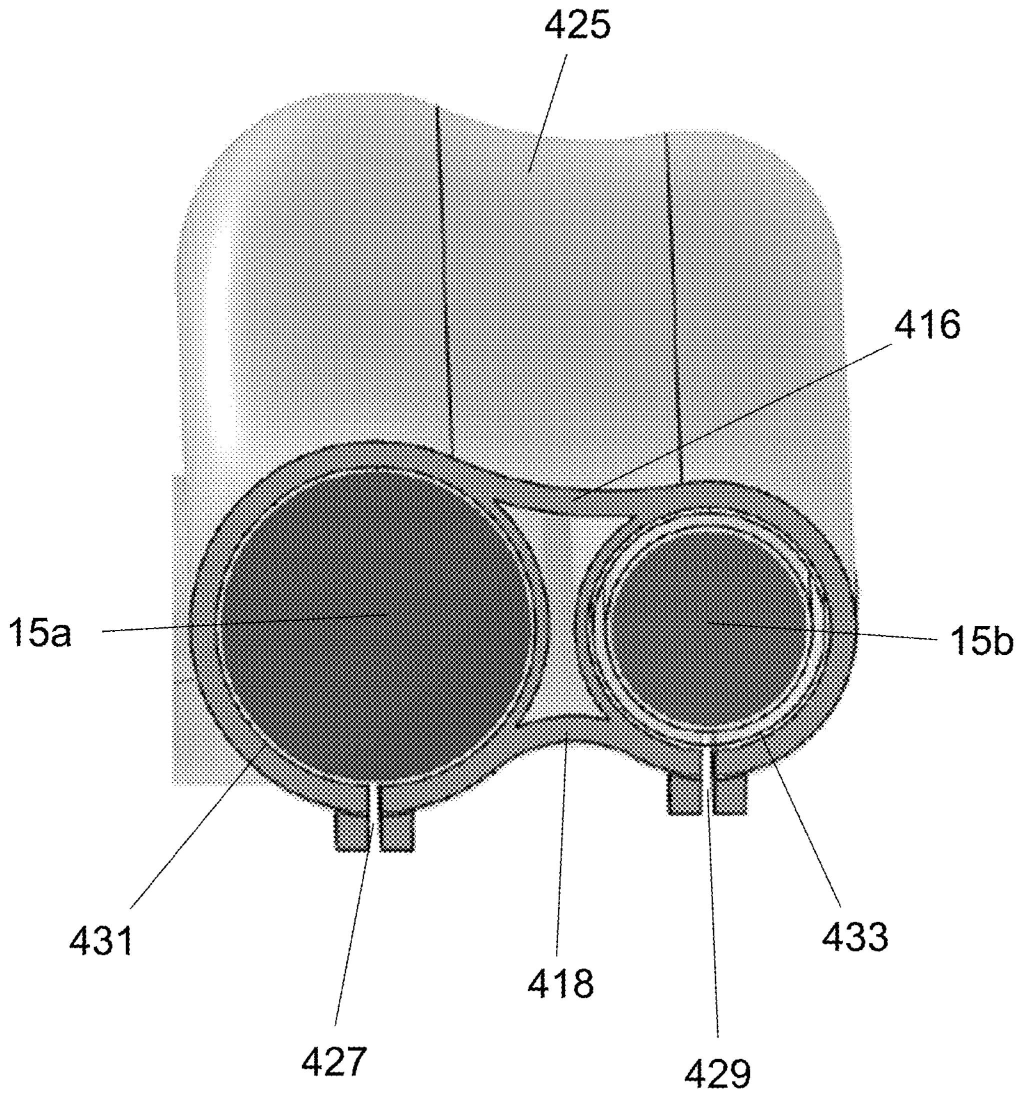
FIG. 14 is a cross-sectional view of a further example cable harness sleeve.

FIG. 14 shows a further example of a sleeve 425 suitable for use as the sleeve 25 described above. The sleeve 425 is similar to the sleeve 325 described with reference to FIGS. 12 and 13, and comprises a first channel 431 in which the first harness 15*a* is received, and a second channel 433 in which the second harness 15*b* is received. A first slit 427 extends along the base of the first channel 431, and extends the full length of the sleeve 425. A second slit 429 extends along the base of the second channel 433 and also runs the full length of the sleeve 25.

In contrast to the sleeve 325, the slits 427, 429 are both located on the underside of the sleeve (rather than on the lateral sides of the sleeve). Such an arrangement has been found to be beneficial because it ensures any moisture that my accumulate inside the sleeve, is able to drain out through the slit.

Figure 15:
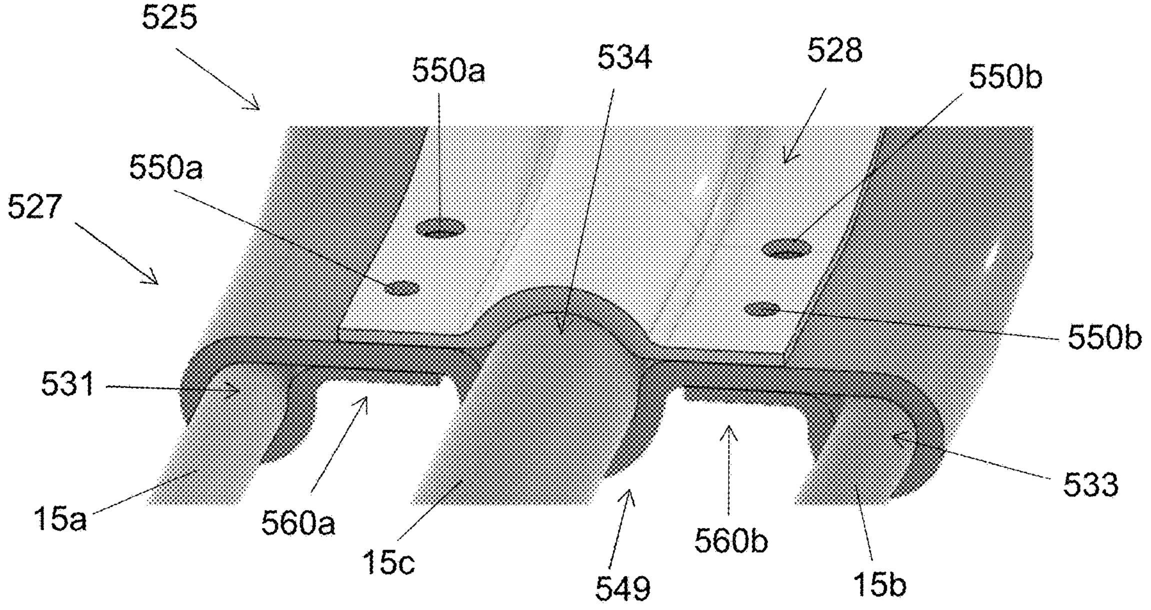
FIG. 15 is a perspective view of a cable harness sleeve comprising a third channel according to an embodiment of the invention, the cable harness sleeve comprising a first sheet and a second sheet.

A sleeve 525 according to a further embodiment of the invention is shown in FIG. 15. The sleeve 525 is suitable for use as the sleeve 25 of the aircraft 1 described above where the aircraft 1 comprises a third cable harness 15*c* extending between the fixed wing and the wing tip device, in addition to the first cable harness 15*a* and the second cable harness 15*b*. In this case, the sleeve 525 comprises a first sheet 527 and a second sheet 528, the respective first and second sheets 527, 528 comprising a non-conducting flexible material, such as FMVQ.

Figure 16:
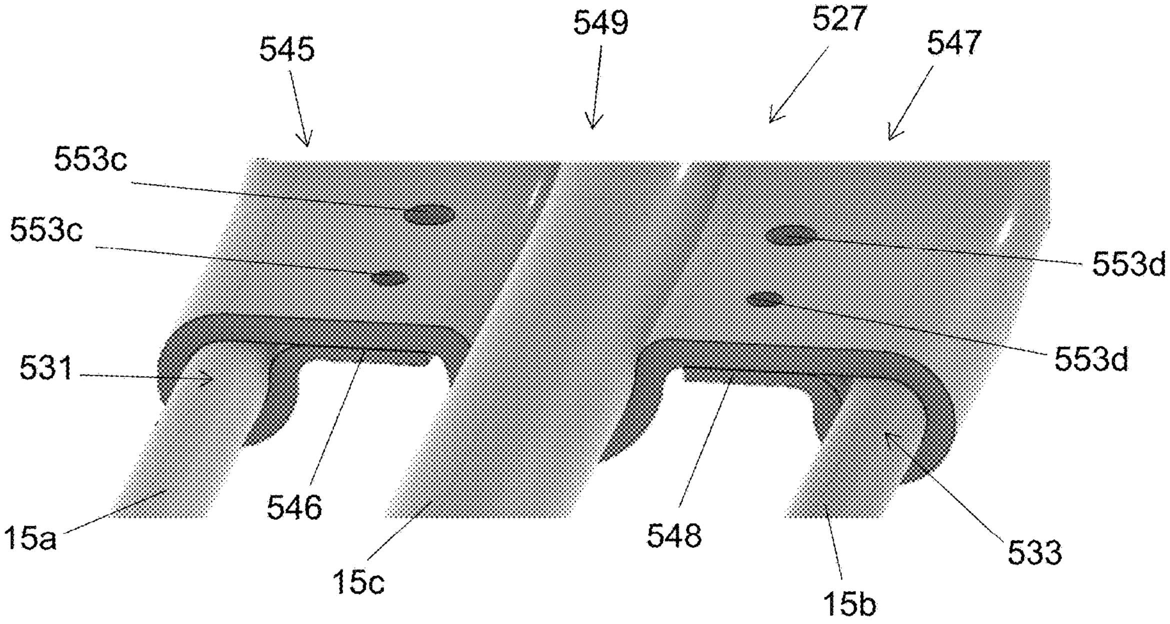
FIG. 16 shows the first sheet of the cable harness sleeve of FIG. 15.

With reference to FIG. 16, which shows only the first sheet 527, the first sheet 527 comprises a first portion 545, an intermediate portion 549, and a second portion 547 arranged along a transverse direction of the sheet, with the intermediate portion 549 being positioned between the first portion 545 and the second portion 547. A first plurality of holes (which are not visible in the figures) are spaced apart along a longitudinal direction on an end 546 of the first portion 545. A second plurality of holes (which are not visible in the figures) are spaced apart along a longitudinal direction on an end 548 of the second portion 547. A third plurality of holes 553*c* are spaced apart along the longitudinal direction on a first transverse side of the intermediate portion 549 and a fourth plurality of holes 553*d* are spaced apart along the longitudinal direction on an opposite second transverse side of the intermediate portion 549.

The second sheet 528 has a width approximately equal to that of the intermediate portion 549 of the first sheet 527 when the first and second sheets 527, 528 are in their secured configuration shown in FIG. 15. The second sheet 528 is provided with a first plurality of holes 550*a* which are spaced along a longitudinal direction on a first transverse side of the second sheet 528 and a second plurality of holes 550*b* which are spaced along a longitudinal direction on an opposite second transverse side of the second sheet 528.

The first sheet 527 is configurable to the secured configuration shown in FIG. 16 by folding the first portion 545 of the sheet around the first cable harness 15*a* to a position in which the end 546 of the first portion 545 rests against the intermediate portion 549 on the first transverse side of the intermediate portion 549 and the holes of the first plurality are aligned with the holes of the third plurality 553*c*, such that the first portion 545 of the sheet defines a first channel 531 in which the first cable harness 15*a* is received. The second portion 547 of the first sheet 527 is similarly folded around the second cable harness 15*b* to a position in which the end 548 of the second portion 547 rests against an opposite second transverse side of the intermediate portion 549 and the holes of the second plurality are aligned with the holes 553*d* of the fourth plurality such that the second portion 547 of the sheet 527 defines a second channel 533 in which the second cable harness 15*b* is received.

Part of the intermediate portion between the respective third and fourth sets of holes 553*c*, 553*d* is partially wrapped around the third cable harness 15*c* on a first side of the third cable harness 15*c*. The second sheet 528 is placed over the third cable harness 15*c* on an opposing second side of the third cable harness 15*c* such that the second sheet 528 and the intermediate portion 549 of the first sheet 527 together define a third channel 534 in which the third cable harness 15*c* is received. As can be seen from a comparison of FIG. 15 and FIG. 16, the first set of holes 550*a* of the second sheet 528 are aligned with the first and third 553*c* sets of holes of the first sheet 527 on a first side of the third channel 534. Similarly, the second set of holes 550*b* of the second sheet 528 are aligned with the second and fourth 553*d* sets of holes of the first sheet 527 on an opposite second side of the third channel 534.

Fasteners, such as the fasteners 500 described above, may be placed in the respective holes of the respective first and second sheets 527, 528 to secure the respective first and second sheets 527, 528 together in the configuration shown in FIG. 15. In the secured configuration of the presently described embodiment, the end 546 of the first portion 545 and the first side of the intermediate portion 549 of the first sheet 527 together with the first side of the second sheet 528 form a first webbing region 560*a* that spaces the first channel 531 from the third channel 534 (and from the second channel 533 positioned on the opposite side of the third channel 534). Similarly, the end 548 of the second portion 547 and the opposite second side of the intermediate portion 549 together with a second side of the second sheet 528 together form a second webbing region 560*b* that spaces the second channel 533 from the third channel 534 (and from the first channel 531 positioned on the opposite side of the third channel 534).

Whilst the present invention has been described and illustrated with reference to particular embodiments, it will be appreciated by those of ordinary skill in the art that the invention lends itself to many different variations not specifically illustrated herein. For example, as can be seen in FIGS. 15 and 16, the first cable harness 15*a* and the second cable harness 15*b* are approximately equal in diameter, whereas the third cable harness 15*c*, which is positioned between the first and second cable harnesses 15*a*, 15*b* has a substantially larger diameter. In other embodiments of the invention the respective first, second, and third cable harnesses 15*a*, 15*b*, 15*c* may all be approximately equal in diameter, or the respective cable harnesses 15*a*, 15*b*, 15*c* may all have a different diameter. Where a sleeve is provided by one or more sheets, it will be appreciated that a sleeve configured to accommodate cable harnesses having different diameters can be provided by tailoring the respective width dimensions of the respective sheets, with larger diameter cable harnesses requiring greater widths of sheet.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing, the wing comprising a fixed wing and a wing tip device moveably mounted at a joint at the end of the fixed wing, the wing tip device being moveable about the joint between: (i) a flight configuration for use during flight, and (ii) a ground configuration for use during ground-based operations, in which ground configuration the wing tip device is moved relative to the fixed wing such that the span of the wing is reduced, wherein the wing comprises a first cable harness and a second cable harness, the first and second cable harnesses extending between the fixed wing and the wing tip device, and each of the first and second cable harnesses comprising a plurality of conductors, the conductors being arranged to transmit electrical power and/or data to the wing tip device, the wing further comprises a protective sleeve and the first and second cable harnesses are received in the protective sleeve, the protective sleeve being in a secured configuration in which at least two opposing parts of the protective sleeve are secured together between the first cable harness and the second cable harness to provide the sleeve with:

a first channel in which the first cable harness is received, a second channel in which the second cable harness is received, and a webbing region formed by the at least two opposing parts, the webbing region extending between the first channel and the second channel such that the first and second cable harnesses are held apart by the webbing region.

2. The aircraft wing of claim 1, wherein the sleeve comprises a fluorosilicone polymer.

3. The aircraft wing of claim 1, wherein the webbing region comprises a barrier, the barrier being positioned between the first cable harness and the second cable harness.

4. The aircraft wing of claim 1, wherein, in the secured configuration of the protective sleeve, the at least two opposing parts are secured together by a plurality of fasteners which pass through the at least two opposing parts, the fasteners being spaced apart along a length direction of the protective sleeve.

5. The aircraft wing of claim 1, wherein the sleeve comprises an outer wall, and the portion of the outer wall surrounding the respective cable harnesses has a thickness of at least 2 millimetres.

6. The aircraft wing of claim 1, wherein the sleeve comprises an outer wall and a first projecting member that projects from an inner surface of the outer wall on a first opposing part and, in the secured configuration of the protective sleeve, the first projecting member abuts with a second opposing part of the protective sleeve such that the first projecting member at least partially forms the barrier between the first cable harness and the second cable harness.

7. The aircraft wing of claim 6, wherein the protective sleeve comprises a second projecting member that projects from an inner surface of the protective sleeve on the second opposing part and, in the secured configuration of the protective sleeve, the second projecting member abuts with the first opposing part of the protective sleeve such that the second projecting member at least partially forms the barrier between the first cable harness and the second cable harness.

8. The aircraft wing of claim 7, wherein the first projecting member is positioned opposite the second projecting member such that, in the secured configuration of the sleeve, the first projecting member and second projecting member abut with one another, the first and second projecting members thereby forming a wall between the first cable harness and the second cable harness.

9. The aircraft wing of claim 1, wherein the protective sleeve comprises a sheet; in the secured configuration of the protective sleeve, the sheet is wrapped around at least one of the first cable harness or second cable harness and a first opposing part of the sheet is secured to a second opposing part of the sheet to form at least one of the first channel or second channel.

10. The aircraft wing of claim 9, wherein the sheet comprises a first portion, a second portion, and an intermediate portion between the first portion and the second portion and, in the secured configuration of the protective sleeve, the first portion of the sheet is wrapped around the first cable harness; an end of the first portion forms an opposing part that is secured to an opposing part formed by the intermediate portion to provide the first channel;

the second portion of the sheet is wrapped around the second cable harness; an end of the second portion forms an opposing part that is secured to an opposing part that is formed by the intermediate portion to form the second channel; and the intermediate portion and at least one of the second portion or first portion forms the webbing region.

11. The aircraft wing of claim 10, wherein the first portion of the sheet wraps around the first harness in a first direction and the second portion of the sheet wraps around the second harness in the first direction such that the intermediate portion forms the barrier between the first cable harness and the second cable harness.

12. The aircraft wing of claim 10, wherein the sheet has a thickness, and wherein the thickness of the first portion of the sheet is approximately equal to the thickness of the second portion of the sheet, and wherein the thickness of the intermediate portion of the sheet is greater than the thickness of the first portion or second portion.

13. The aircraft wing of claim 10, wherein, in the secured configuration of the protective sleeve, the end of the first portion of the sheet is secured to the end of the second portion of the sheet.

14. The aircraft wing of claim 10, wherein the wing comprises a third cable harness extending between the fixed wing and the wing tip device, the third cable harness comprising a plurality of conductors arranged to transmit electrical power and/or data to the wing tip device; and part of the intermediate portion of the sheet at least partially defines a third channel in which the third cable harness is received.

15. The aircraft wing of claim 14, wherein the sleeve comprises a further sheet and the further sheet is secured to the intermediate portion of the sheet to provide the third channel between the sheet and the further sheet.

16. An aircraft comprising the aircraft wing of claim 1.

17. A cable harness sleeve configured for use on a folding wing, wherein the sleeve has an outer wall which surrounds and defines an internal channel, a first opposing part on a first side of the outer wall, a second opposing part on an opposite second side of the outer wall, and a first projecting member that projects from an inner surface of the outer wall on the first opposing part, wherein the protective sleeve is configurable to a secured configuration in which the first opposing part is moved towards the second opposing part to move the first projecting member into abutment with the second opposing part to provide the sleeve with:

a first channel configured to receive a first cable harness, a second channel configured to receive a second cable harness, and a webbing region formed by the first opposing part and the second opposing part, the webbing region extending between the first channel and the second channel to fix the position of the first channel relative to the second channel; and, wherein the protective sleeve comprises a second projecting member that projects from an inner surface of the protective sleeve on the second opposing part and, in the secured configuration of the protective sleeve, the second projecting member abuts with the first opposing part of the protective sleeve.

18. The cable harness sleeve of claim 17, wherein the outer wall of the protective sleeve has a first side portion and an opposite second side portion, the first opposing part connecting the first side portion with the second side portion on an upper side of the sleeve and the second opposing part connecting the first side portion with the second side portion on a lower side of the sleeve, and an internal height of the first side portion is greater than an internal height of the second side portion such that, when the sleeve is in the secured configuration, the first channel has a larger internal dimension than the second channel.

19. The cable harness sleeve of claim 17, wherein a first plurality of holes are formed in the first opposing portion, the holes of the first plurality being spaced apart along the first opposing portion; a second plurality of holes are formed in the second opposing portion, the holes of the second plurality being spaced apart along the second opposing portion; and the first plurality of holes is arranged with respect to the second plurality of holes such that, in the secured configuration of the cable harness, the holes of the first plurality are aligned with the holes of the second plurality.

* * * * *